(12) United States Patent
Sako et al.

(10) Patent No.: US 8,559,487 B2
(45) Date of Patent: Oct. 15, 2013

(54) TRANSMITTING METHOD AND TRANSMITTING DEVICE, RECEIVING METHOD AND RECEIVING DEVICE, AND TRANSFER METHOD AND TRANSFER SYSTEM

(75) Inventors: Yoichiro Sako, Tokyo (JP); Takayuki Usami, Tokyo (JP); Yuichiro Deguchi, Kanagawa (JP); Masayuki Obata, Tokyo (JP); Masahiro Hotori, Kanagawa (JP); Tatsuya Inokuchi, Kanagawa (JP); Shuichi Ito, Tokyo (JP); Toru Takeda, Saitama (JP)

(73) Assignee: Sony Corporation, Tokyo (JP)

( * ) Notice: Subject to any disclaimer, the term of this patent is extended or adjusted under 35 U.S.C. 154(b) by 687 days.

(21) Appl. No.: 12/565,936

(22) Filed: Sep. 24, 2009

(65) Prior Publication Data

US 2010/0017594 A1      Jan. 21, 2010

Related U.S. Application Data

(60) Division of application No. 11/715,933, filed on Mar. 9, 2007, now Pat. No. 7,693,232, which is a continuation of application No. 09/407,550, filed on Sep. 28, 1999, now Pat. No. 7,372,915.

(30) Foreign Application Priority Data

Sep. 30, 1998  (JP) .................................... 10-276766

(51) Int. Cl.
    *H04B 1/38*      (2006.01)
    *H04L 5/16*      (2006.01)

(52) U.S. Cl.
    USPC ........................................... 375/219; 455/39

(58) Field of Classification Search
    USPC ............................. 375/219, 295, 316; 455/29
    See application file for complete search history.

(56) References Cited

U.S. PATENT DOCUMENTS

| 4,230,990 A | 10/1980 | Lert, Jr. et al. |
| 4,739,510 A | 4/1988 | Jeffers et al. |

(Continued)

FOREIGN PATENT DOCUMENTS

| JP | 04-223787 | 8/1992 |
| JP | 06-132916 | 5/1994 |

(Continued)

OTHER PUBLICATIONS

Notification of Reasons for Refusal, Japanese Patent Appln. No. HEI 10-276766, dated Feb. 8, 2008.

(Continued)

*Primary Examiner* — Curtis Odom
(74) *Attorney, Agent, or Firm* — Oblon, Spivak, McClelland, Maier & Neustadt, L.L.P.

(57) ABSTRACT

Data broadcast data, which is broadcast in data broadcasts, is constructed by disposing, for example, EMD (Electric Music Distribution) links required to acquire song data as actual broadcast data, which is broadcast in actual broadcasts by a transmitting device, the actual broadcast data is transmitted, and the data broadcast data wherein the EMD links for the song data in the actual broadcasts are disposed, is transmitted periodically during the transmission of the actual broadcast data. The actual broadcast data and the data broadcast data are received by a user terminal, and the EMD links disposed in the data broadcast data are stored whenever there is an input of an operation to attach a "bookmark". Thus, audio data such as songs in programs broadcast can easily be acquired by radio.

85 Claims, 19 Drawing Sheets

(56) References Cited

U.S. PATENT DOCUMENTS

| | | | |
|---|---|---|---|
| 4,789,863 A | 12/1988 | Bush | |
| 5,274,815 A | 12/1993 | Trissel et al. | |
| 5,539,635 A | 7/1996 | Larson, Jr. | |
| 5,675,575 A | 10/1997 | Wall, Jr. et al. | |
| 5,703,795 A | 12/1997 | Mankovitz | |
| 5,777,997 A | 7/1998 | Kahn et al. | |
| 5,907,793 A | 5/1999 | Reams | |
| 6,012,086 A * | 1/2000 | Lowell | 709/218 |
| 6,126,265 A | 10/2000 | Childers et al. | |
| 6,216,265 B1 | 4/2001 | Roop et al. | |
| 6,268,849 B1 | 7/2001 | Boyer et al. | |
| 6,295,093 B1 | 9/2001 | Park et al. | |
| 6,298,480 B1 | 10/2001 | Beuk et al. | |
| 6,310,891 B1 | 10/2001 | Dove et al. | |
| 6,385,596 B1 * | 5/2002 | Wiser et al. | 705/51 |

FOREIGN PATENT DOCUMENTS

| | | |
|---|---|---|
| JP | 07-500715 | 1/1995 |
| JP | 07-212327 | 8/1995 |
| JP | 08-008852 | 1/1996 |
| JP | 08-032534 | 2/1996 |
| JP | 08-056346 | 2/1996 |
| JP | 08-139624 | 5/1996 |
| JP | 08-242187 | 9/1996 |
| JP | 08-256075 | 10/1996 |
| JP | 09-027790 | 1/1997 |
| JP | 09-081169 | 3/1997 |
| JP | 09-121197 | 5/1997 |
| JP | 09-160852 | 6/1997 |
| JP | 09-162818 | 6/1997 |
| JP | 09-205635 | 8/1997 |
| JP | 09-214380 | 8/1997 |
| JP | 09-312622 | 12/1997 |
| JP | 10-013367 | 1/1998 |
| JP | 10-056632 | 2/1998 |
| JP | 10-135855 | 5/1998 |
| JP | 10-163988 | 6/1998 |
| JP | 10-173612 | 6/1998 |
| JP | 10-191195 | 7/1998 |
| WO | WO 97/21291 | 6/1997 |
| WO | WO 98/28870 | 7/1998 |

OTHER PUBLICATIONS

H. Tominaga et al., "The Information Refrigerator System," Waseda University Science and Engineering Faculty, Sep. 17, 1993, vol. 93, No. 82, pp. 1-8.

European Search Report issued Feb. 26, 2013 in European Patent Application No. 10010612.9-1907/2264920, 5 pages.

* cited by examiner

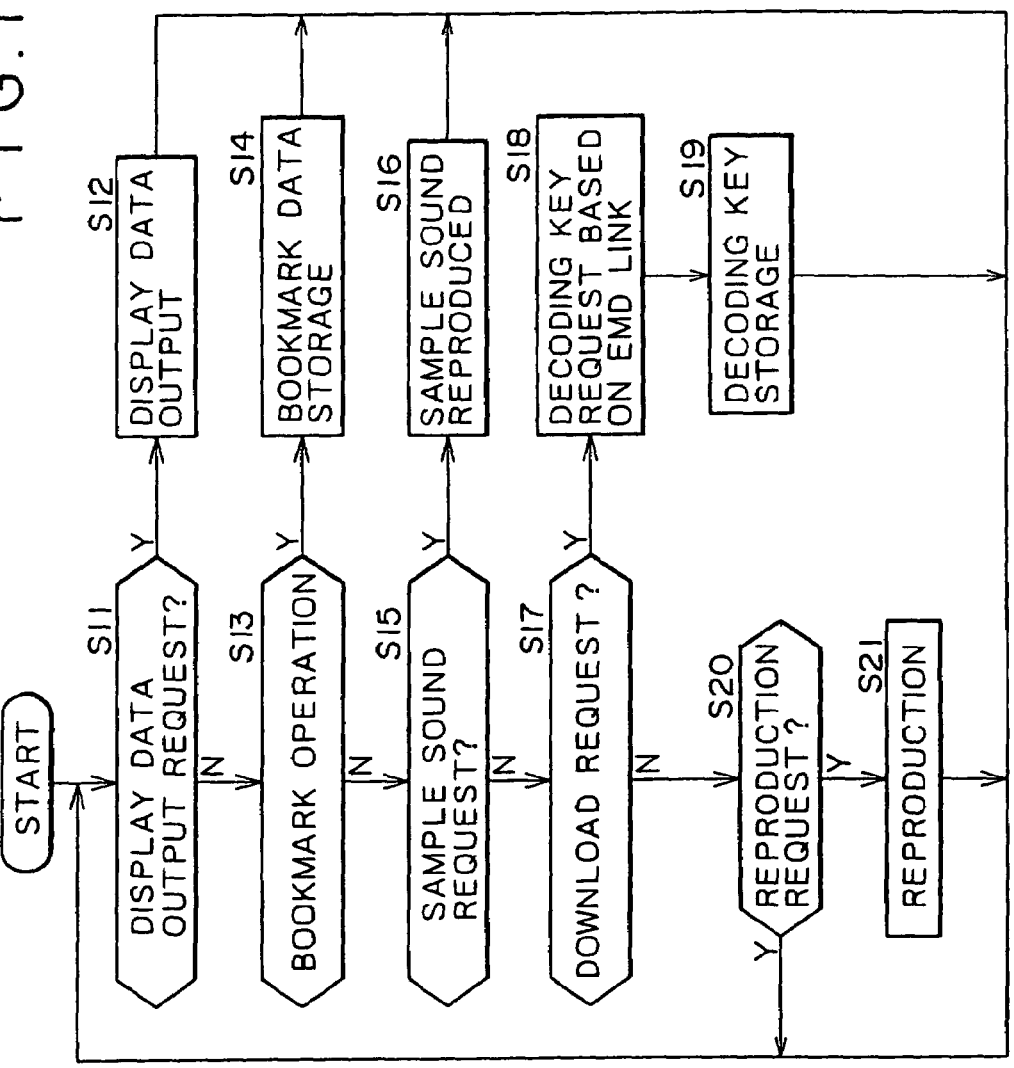

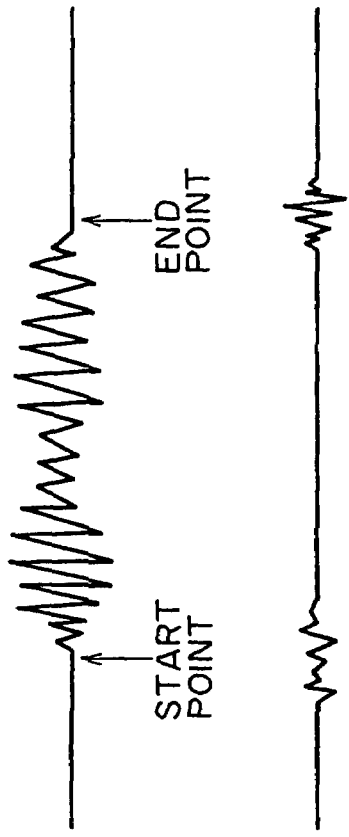
FIG. 11A FULL SONG DATA
FIG. 11B DJ'S VOICE, NARRATION, SOUND EFFECTS, ADVERTISEMENTS
FIG. 11C ACTUAL BROADCAST DATA
FIG. 11D GENERATING DATA

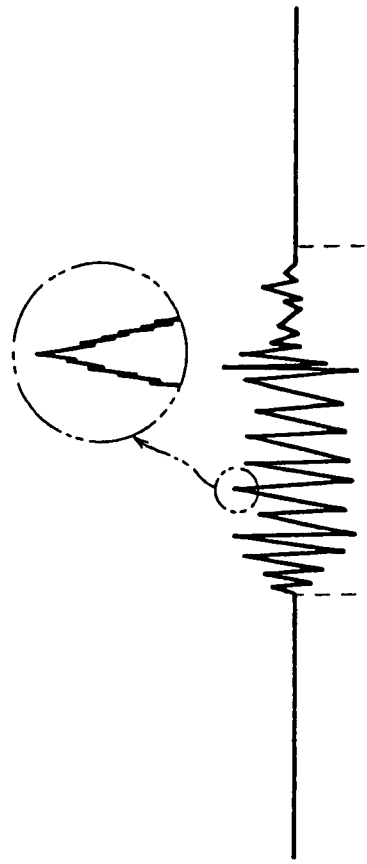
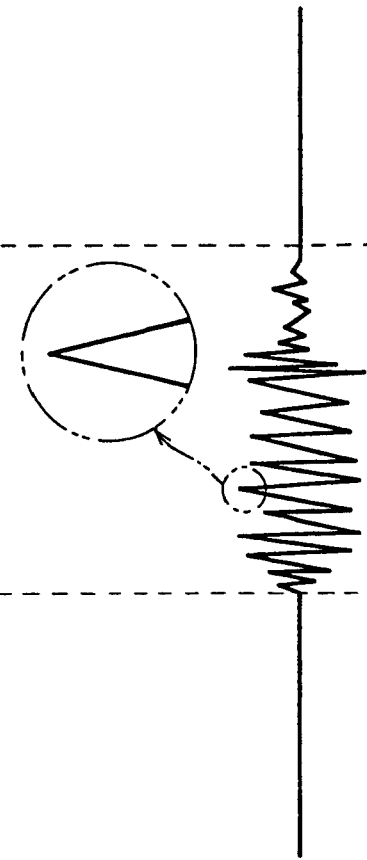
FIG. 16A FULL SONG DATA
FIG. 16B ACTUAL BROADCAST DATA
FIG. 16C GENERATING DATA

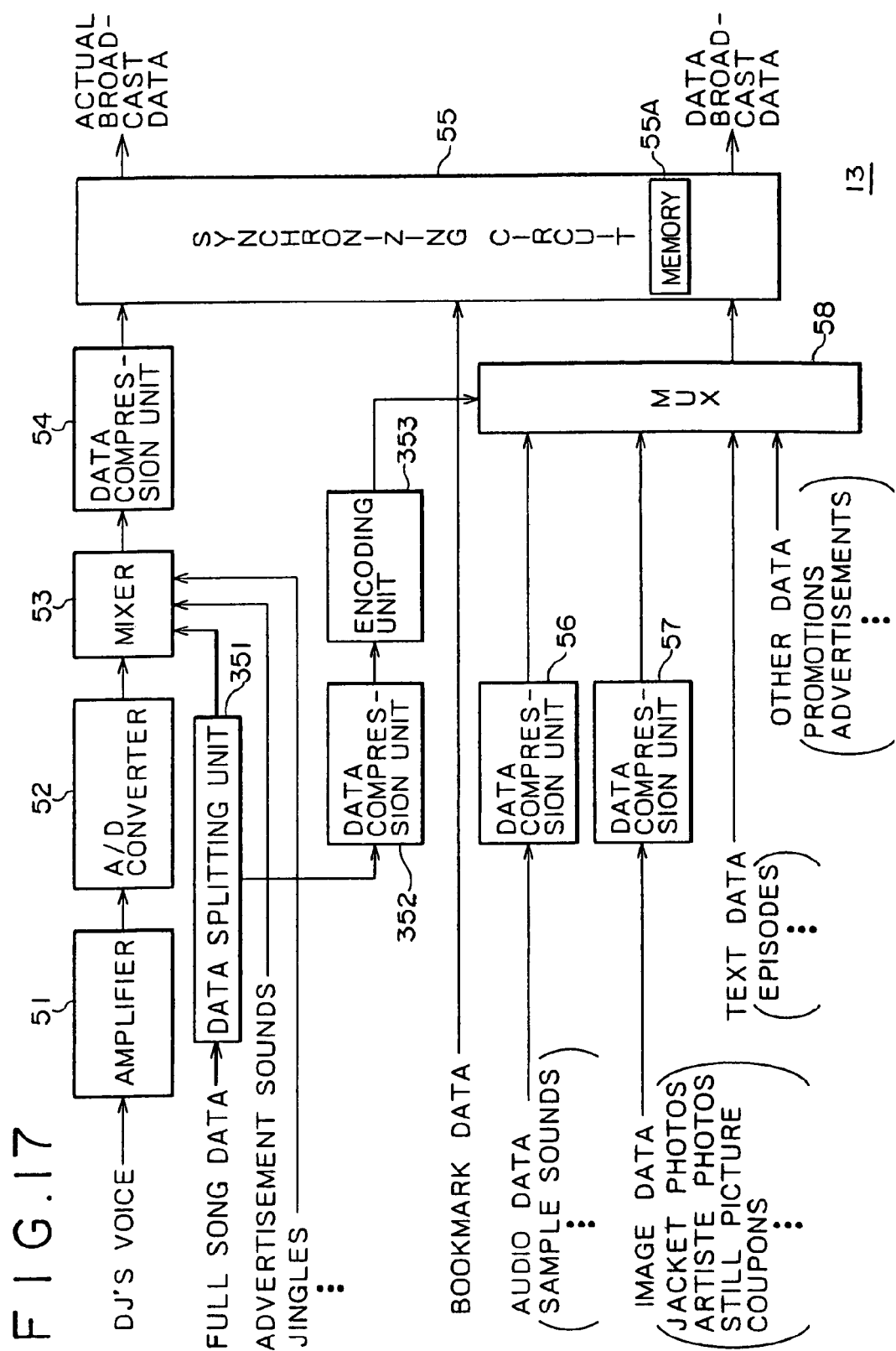

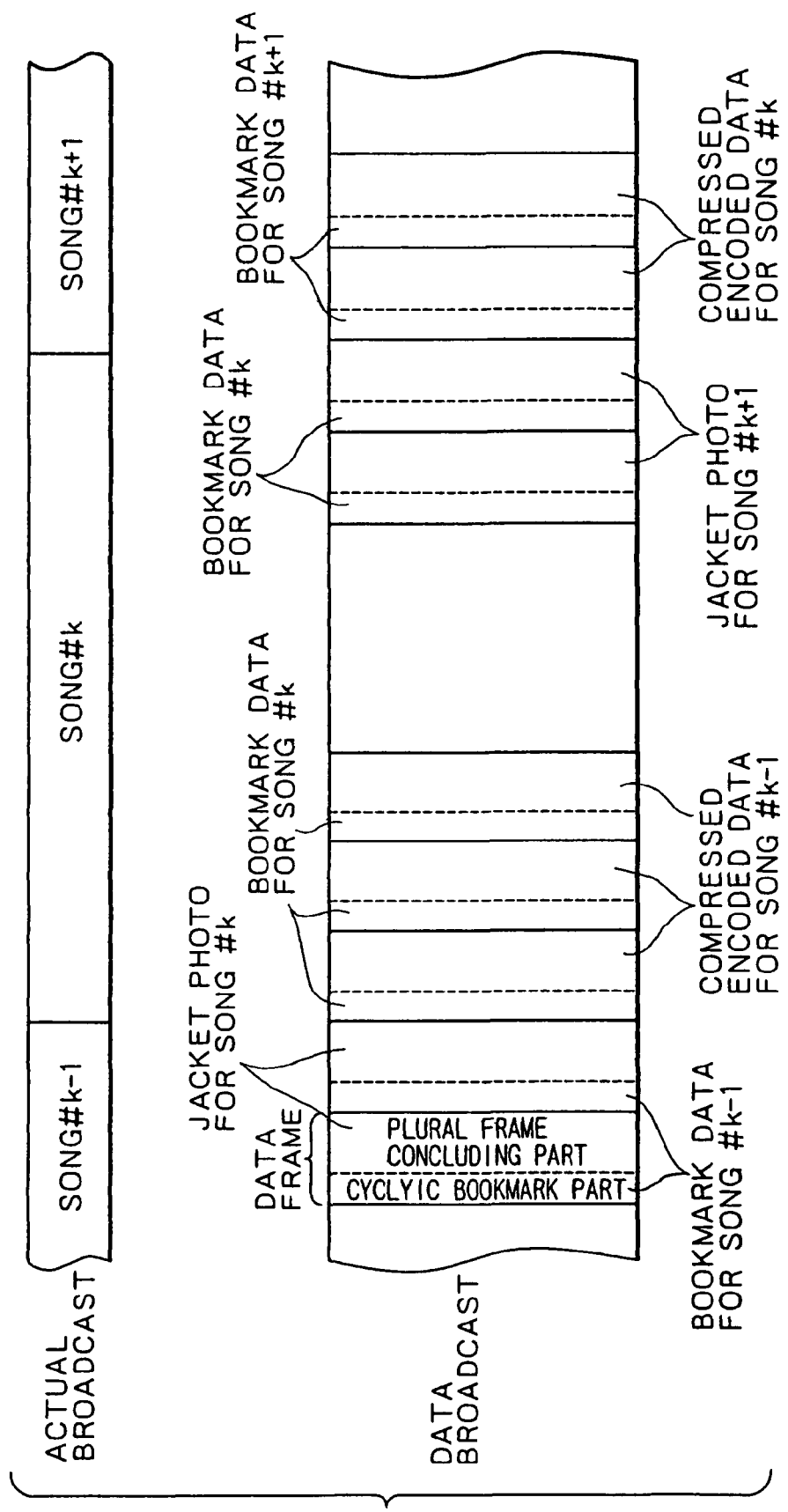

TRANSMITTING METHOD AND TRANSMITTING DEVICE, RECEIVING METHOD AND RECEIVING DEVICE, AND TRANSFER METHOD AND TRANSFER SYSTEM

This is a divisional of U.S. application Ser. No. 11/715,933, filed Mar. 9, 2007 now U.S. Pat. No. 7,693,232, which is a continuation of U.S. application Ser. No. 09/407,550, filed Sep. 28, 1999, issued as U.S. Pat. No. 7,372,915 on May 13, 2008, which claims the benefit of Japanese Application No. 10-276766, filed Sep. 30, 1998, all of which are incorporated herein by reference in their entirety.

BACKGROUND OF THE INVENTION

1. Field of the Invention

This invention relates to a transmitting method and transmitting device, receiving method and receiving device, and transfer method and transfer system. In particular, it relates to a transmitting method and transmitting device, receiving method and receiving device, and transfer method and transfer system which facilitate the acquisition of audio data such as songs broadcast in the form of programs such as radio programs or television programs, or video data such as films.

2. Description of the Related Art

Programs such as radio broadcasts are received by a radio receiver, for example.

However in radio broadcasting, if a program is a program of songs, the program is broadcast (transmitted) as a broadcast signal. Herein, broadcast signals may include the voice of an announcer (disc jockey), sound effects or jingles, and the song itself may therefore be recorded on a commercial CD (compact disc) or the like. Data which does not comprise any sounds other than those of the songs (referred to hereafter for convenience as full song data) may be said to be related to the broadcast signal, and may therefore be described as related data.

A user may hear a song in a radio broadcast (including various other sounds apart from the song such as for example an announcer's voice (referred to hereafter for convenience as a broadcast song)), and if he likes it, he may wish to acquire it. In such a case, he may go to a store to purchase the CD on which the song (full song data) is recorded.

However, if the user desires to purchase a CD on which a song he likes is recorded (stored), he must know the title and the name of the singer, etc., and if the song is a new song, the user often does not know the title. Also in a radio broadcast, the announcer does mention the song's title and the singer's name, but in the case of such a verbal introduction the user may miss the information or hear it incorrectly.

In "visual" radio broadcasting which recently started, additional information broadcast in the form of data is included in the broadcast signal in addition to the broadcast signal which constitutes the actual program (referred to hereafter as "actual broadcast"). The additional information transmitted in the form of data contains the song title and the singer's name, so the user can confirm the song title and singer's name by looking at this additional information.

However, if the user overlooks it or does not make a note of it, the user may no longer be able to identify the relation between the additional information transmitted in visual broadcasting to the broadcast itself.

SUMMARY OF THE INVENTION

It is therefore an object of this invention to solve the above problems, and to provide a way of easily acquiring for example audio data such as songs which were broadcast by radio or television, or video data such as films.

The transmitting method according to this invention comprises a constructing step which constructs additional information in which acquiring information necessary to acquire related data related to a broadcast signal is disposed, and a transmitting step which transmits the broadcast signal, and transmits the additional information, in which the acquiring information concerning the related data related to this broadcast signal is disposed, on plural occasions during the transmission of the broadcast signal.

The transmitting device according to this invention comprises a constructing means which constructs additional information in which acquiring information necessary to acquire related data related to a broadcast signal is disposed, and a transmitting means which transmits the broadcast signal and transmits the additional information, in which the acquiring information concerning the related data related to this broadcast signal is disposed, on plural occasions during the transmission of the broadcast signal.

The receiving method according to this invention comprises a receiving step which receives the broadcast signal and additional information in which acquiring information necessary to acquire related data related to this broadcast signal is disposed, and an acquiring information storing step which stores the acquiring information disposed in the additional information when there is a predetermined input.

The receiving device according to this invention comprises a receiving means which receives the broadcast signal and additional information in which acquiring information necessary to acquire related data related to this broadcast signal is disposed, and an acquiring information storing step which stores the acquiring information disposed in the additional information when there is a predetermined input.

In the transfer method according to this invention, the transmitting device comprises a constructing step which constructs the additional information in which acquiring information necessary to acquire related data related to the broadcast signal is disposed, and a transmitting step which transmits the broadcast signal, and transmits the additional information, in which the acquiring information concerning said related data related to this broadcast signal is disposed, on plural occasions during the transmission of the broadcast signal, and the receiving device comprises a receiving step which receives the broadcast signal and the additional information, and an acquiring information storing step which stores the acquiring information disposed in the additional information when there is a predetermined input.

In the transfer system according to this invention, the transmitting device comprises a constructing means which constructs the additional information in which acquiring information necessary to acquire related data related to the broadcast signal is disposed, and a transmitting means which transmits the broadcast signal, and transmits the additional information, in which the acquiring information concerning the related data related to this broadcast signal is disposed, on plural occasions during the transmission of the broadcast signal, and the receiving device comprises a receiving means which receives the broadcast signal and additional information, and an acquiring information storing means which stores the acquiring information disposed in the additional information when there is a predetermined input.

In the transmitting method according to this invention, additional information is constructed in which acquiring information necessary to acquire related data related to the broadcast signal is disposed, the broadcast signal is transmitted, and the additional information in which the acquiring information concerning the related data related to this broadcast signal is disposed, is transmitted on plural occasions during the transmission of the broadcast signal.

In the transmitting device according to this invention, the constructing means constructs additional information in which acquiring information necessary to acquire related data related to the broadcast signal is disposed, the transmitting means transmits the broadcast signal, and transmits the additional information, in which the acquiring information concerning the related data related to this broadcast signal is disposed, on plural occasions during the transmission of the broadcast signal.

In the receiving method according to this invention, the broadcast signal and additional information in which acquiring information necessary to acquire related data related to this broadcast signal is disposed, are received, and the acquiring information disposed in the additional information is stored when there is a predetermined input.

In the receiving device according to this invention, the receiving means receives the broadcast signal and additional information in which acquiring information necessary to acquire related data related to this broadcast signal is disposed, and the acquiring information storing means stores the acquiring information disposed in the additional information when there is a predetermined input.

In the transfer method according to this invention, additional information is constructed in which acquiring information necessary to acquire related data related to the broadcast signal is disposed, the broadcast signal is transmitted, the additional information in which the acquiring information concerning the related data related to this broadcast signal is disposed is transmitted on plural occasions during the transmission of the broadcast signal, the broadcast signal and additional information are received, and the acquiring information disposed in the additional information is stored when there is a predetermined input.

In the transfer system according to this invention, the constructing means constructs the additional information in which acquiring information necessary to acquire related data related to the broadcast signal is disposed, the transmitting means transmits the broadcast signal and transmits the additional information, in which the acquiring information concerning said related data related to this broadcast signal is disposed, on plural occasions during the transmission of the broadcast signal, the receiving means receives the broadcast signal and additional information, and the acquiring information storing means stores the acquiring information disposed in the additional information when there is a predetermined input.

BRIEF DESCRIPTION OF THE DRAWINGS

FIG. 10 is a flowchart for describing the processing of the signal processing unit 27 in FIG. 9.

FIGS. 11A to 11D are a figure for describing a method of providing full song data using actual broadcast data.

FIGS. 16A to 16C are a figure for describing a method of providing full song data using actual broadcast data.

FIG. 17 is a block diagram showing a fourth example of the construction of the signal processing unit 13 in FIG. 4.

FIG. 18 is a figure showing the transmitting contents of an actual broadcast and the transmitting contents of a data broadcast.

DETAILED DESCRIPTION OF THE PREFERRED EMBODIMENTS

Figure 1:
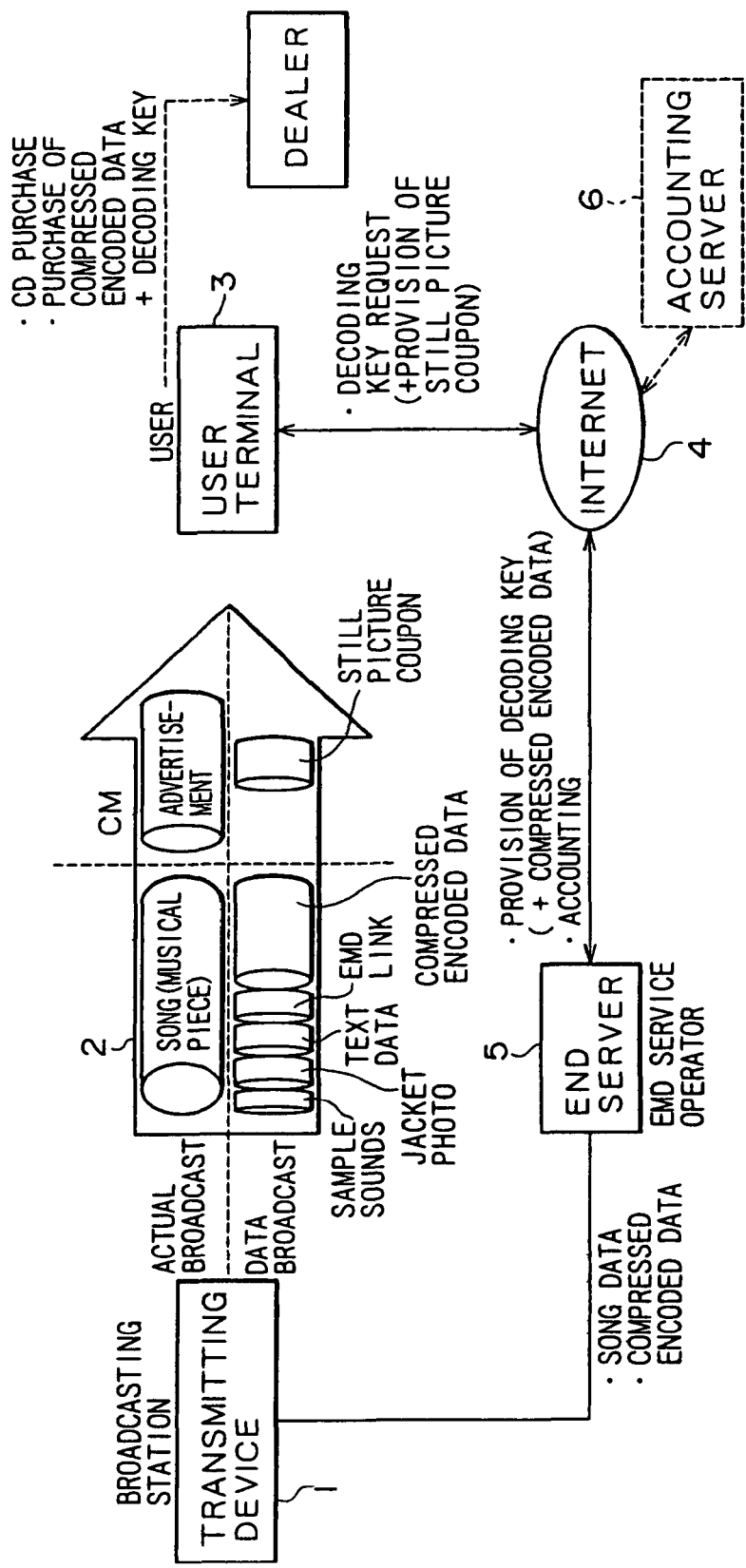
FIG. 1 is a block diagram showing a typical construction of one embodiment of a bookmark radio system applying this invention.

Hereafter, some preferred embodiments of this invention will be described, but first, to clarify the correspondence between the various means within the scope and spirit of the invention as defined by the appended claims and embodiments, the features of this invention will be discussed by adding the corresponding embodiment (as an example) in brackets after each means.

The transmitting device according to claim 34 is a transmitting device for transmitting a predetermined broadcast signal together with predetermined additional information, this device comprising a constructing means (for example, a synchronizing circuit 55 and MUX 58 shown in FIG. 7) which constructs the additional information in which acquiring information necessary to acquire related data related to the broadcast signal is disposed, and a transmitting means (for example, the synchronizing circuit 55 shown in FIG. 7) which transmits the broadcast signal, and transmits the additional information, in which the acquiring information concerning the related data related to this broadcast signal is disposed, on plural occasions during the transmission of the broadcast signal.

The transmitting device according to claim 35 further comprises an error detection/correction means (for example, an ECC circuit 15 shown in FIG. 4) which performs error detection/correction on the additional information.

The transmitting device according to claim 53 further comprises a splitting means (for example, the data dividing unit 351 shown in FIG. 17) which splits the related data into a first component and a second component, wherein the transmitting means transmits the first component as the broadcast signal.

The receiving device according to claim 101 is a receiving device which receives the predetermined broadcast signal together with predetermined additional information in which acquiring information necessary to acquire the related data related to this broadcast signal is disposed, and comprises a receiving means (for example, a digital radio tuner 22 shown in FIG. 5) which receives the broadcast signal and additional information, and an acquiring information storage means (for example, a storage 64) which stores the acquiring information disposed in the additional information when there is a predetermined input.

The receiving device according to claim 102 further comprises an error detection/correction means (for example, an ECC circuit 26 shown in FIG. 5) which performs error detection/correction on the additional information.

The receiving device according to claim 103 further comprises a temporary storage means (for example, a memory 161 shown in FIG. 13) which temporarily stores the broadcast signal received by the receiving means.

Figure 5:
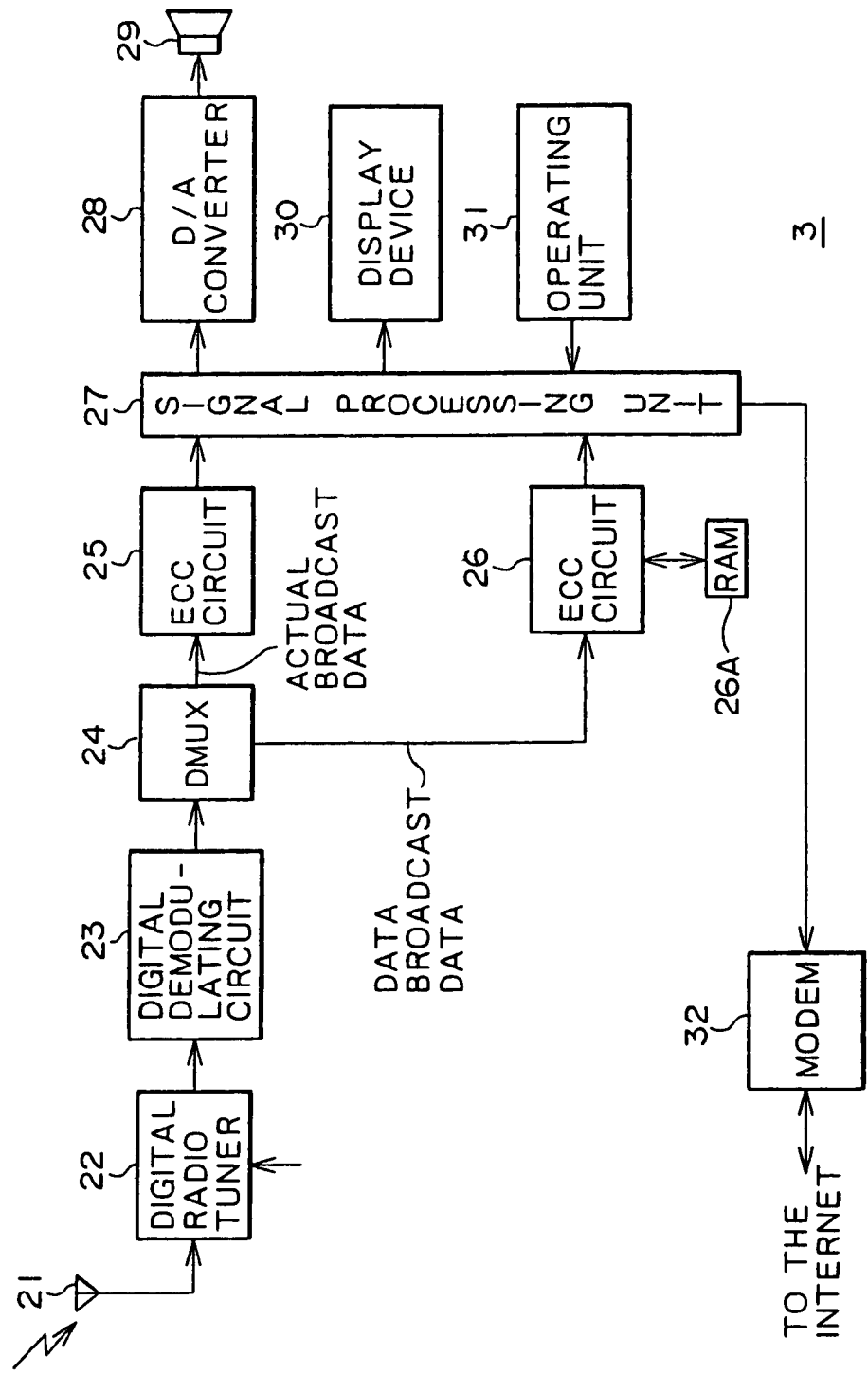
FIG. 5 is a block diagram showing an example of a user terminal 3 in FIG. 3.

The receiving device according to claim 104 further comprises a temporary storage means (for example, the RAM (Random Access Memory) shown in FIG. 5) which temporarily stores the additional information received by the receiving means.

The receiving device according to claim 112 further comprises an outputting means (for example, a speaker 29 or display device 30 shown in FIG. 5) which outputs the acquiring information.

The receiving device according to claim 116 further comprises an outputting means (for example, the speaker 29 or display device 30 shown in FIG. 5) which outputs information useful for recognizing the content of the related data.

The receiving device according to claim 118 further comprises a related data storing means (for example, a storage 64 shown in FIG. 9) which stores the related data disposed in the additional information when there is a predetermined input.

The receiving device according to claim 120 further comprises an acquiring means (for example, a download processor 65 shown in FIG. 9) which acquires a decoding key for decoding the related data based on the acquiring information.

The receiving device according to claim 121 further comprises a decoding means (for example, a decoder 68 shown in FIG. 9) which decodes the related data based on the decoding key.

The receiving device according to claim 122 further comprises an acquiring means (for example, the download processor 65) which acquires the related data stored in a database based on the acquiring information when the related data is stored in a predetermined database.

The receiving device according to claim 124 further comprises a decoding means (for example, the decoder 68 shown in FIG. 9) which decodes the related data based on the decoding key.

The receiving device according to claim 128 further comprises an acquiring means (for example, the download processor 65 shown in FIG. 13) which acquires the decoding key for decoding a second signal based on the acquiring information.

The receiving device according to claim 129 further comprises a decoding means (for example, the decoder 68) which decodes the second signal based on the decoding key.

Figure 13:
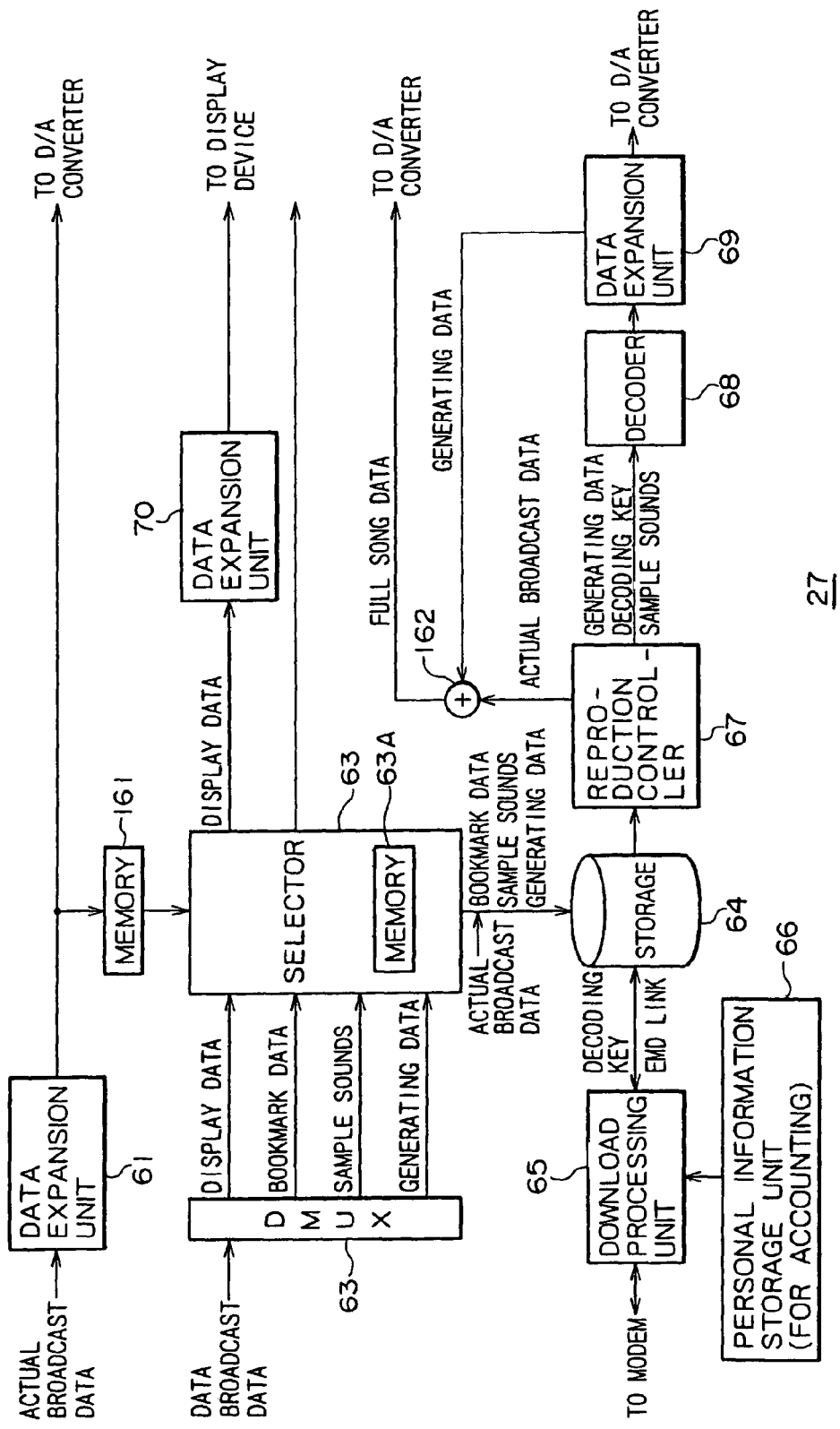
FIG. 13 is a block diagram showing a second example of the construction of the signal processing unit 27 in FIG. 5.

The receiving device according to claim 130 further comprises a generating means (for example, a computing unit 162 shown in FIG. 13 which generates the related data based on the broadcast signal and the second signal.

The receiving device according to claim 134 further comprises an acquiring means (for example, the download processor 65 shown in FIG. 13) which acquires a decoding key for decoding a first image or sound or a second image or sound of an overlapping part based on the acquiring information.

The receiving device according to claim 135 further comprises a decoding means (for example, the decoder 68 shown in FIG. 13) for decoding the first image or sound or the second image or sound of the overlapping part based on the decoding key.

The receiving device according to claim 136 further comprises a generating means (for example, the computing unit 162 shown in FIG. 13) for generating the related data using the broadcast signal, and the first image or sound or the second image or sound of the overlapping part.

The receiving device according to claim 140 further comprises an acquiring means (for example, the download processor 65 shown in FIG. 13) which acquires a decoding key for decoding the second component based on the acquiring information.

The receiving device according to claim 141 further comprises a decoding means (for example, the decoder 68 shown in FIG. 13) for decoding the second component based on the decoding key.

The receiving device according to claim 142 further comprises a generating means (for example, the computing unit 162 shown in FIG. 13) which generates the related data using the broadcast signal and the second signal.

Figure 7:
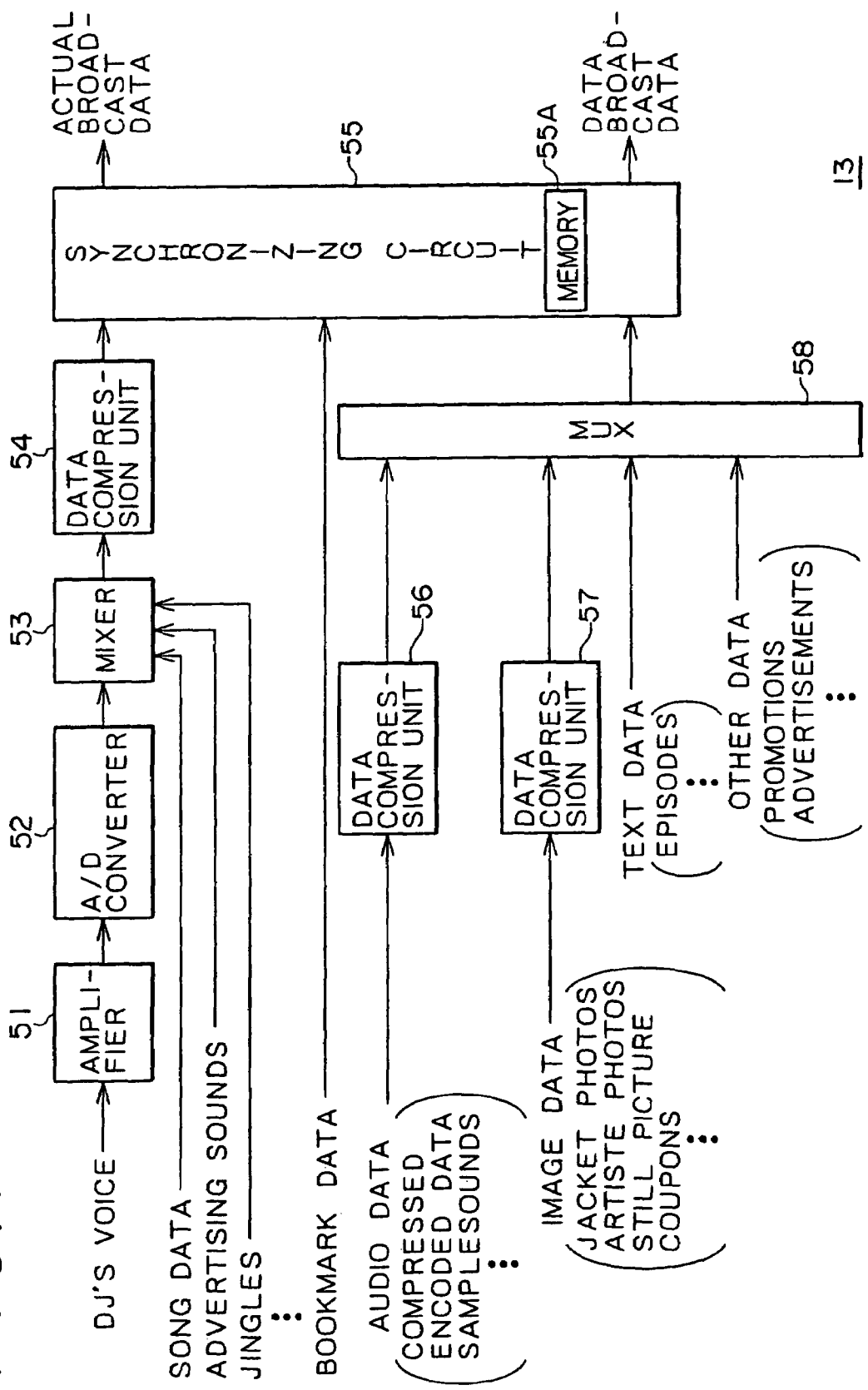
FIG. 7 is a block diagram showing a first example of the construction of a signal processing unit 13 in FIG. 4.

The transfer system according to claim 145 is a transfer system comprising a transmitting device for transmitting a predetermined broadcast signal together with predetermined additional information, and a receiving device for receiving the predetermined broadcast signal together with the predetermined additional information, wherein the transmitting device comprises: constructing means (for example, the synchronizing circuit 55 and MUX 58 shown in FIG. 7) which constructs the additional information in which acquiring information necessary to acquire related data related to the broadcast signal is disposed, and transmitting means (for example, the synchronizing circuit 55 shown in FIG. 7) which transmits the broadcast signal, and transmits the additional information, in which the acquiring information concerning the related data related to this broadcast signal is disposed, on plural occasions during the transmission of the broadcast signal, and the receiving device comprises: receiving means (for example, the digital radio tuner 22 shown in FIG. 5) which receives the broadcast signal and additional information, and an acquiring information storing means (for example, the storage 64 shown in FIG. 9) which stores the acquiring information disposed in the additional information when there is a predetermined input.

It will however be understood that this description is in no way limited to the various means stated above.

FIG. 1 shows one embodiment of a bookmark radio (BMR) system (the term system means a logical collection of units) which applies this invention, wherein the component devices may or may not be in the same cabinet.

The transmitting device 1 functions as a digital radio broadcasting station, which performs digital radio broadcasts via, for example, a ground wave which is a transmitting medium 2.

The digital radio broadcasts performed by the transmitting device 1 comprises an actual broadcast and a data broadcast. The data in the actual broadcast (referred to hereafter for convenience as actual broadcast data) comprises song data (song data for broadcasting) generally broadcast in the form of a program, and data in a sponsor's advertisements ("commercials").

The data in the data broadcast (referred to hereafter for convenience as data broadcast data) comprises data in sample sounds or jacket photos, text data, EMD (Electric Music Distribution) links, compressed encoded data, and still picture coupons, etc. This actual broadcast data and data broadcast data are received by the user terminal 3.

The user terminal 3 may for example be a portable or suspension type of radio receiver, or a car radio receiver (car audio device), etc. The actual broadcast data from the transmitting device 1 are received, and output as a sound. The data broadcast data are also received by the user terminal 3, and are output as sound or displayed if necessary.

Specifically, the data broadcast data comprises for example the beginnings or theme tunes of the songs broadcast in the actual broadcast data, which are offered to the user as samples. The data broadcasting data further comprises for example a jacket photo of a CD on which the songs broadcast in the actual broadcast data are recorded, a photo of the singer of the songs (artiste's photo), and text data including song titles, the singer's name, and name of the record company (producing company).

In the data broadcast data, the full song data corresponding to the song data for broadcasting are compressed, and this data also comprises compressed encoded data.

The data broadcast data are received by the user terminal 3, and the jacket photo, song titles, singer's name, etc. are displayed or output as sample sounds, etc., depending on a user operation.

If the user hears broadcast song data in the actual broadcast which he likes, he operates the user terminal 3 to insert a "bookmark" (like putting a bookmark in a book). The user terminal 3 is also operated to request a decoding key to decode compressed encoded data when full song data is desired after hearing a sample sound during or after listening to broadcast song data. The user terminal 3 places a request for a decoding key with an EMD server 5 of an EMD service operator who manages and distributes full song data.

Specifically, the EMD link in the data broadcast data comprises the IP (Internet Protocol) address and the URL (Uniform Resource Locator) of the EMD server 5 which are used for accessing the location which offers the full song data. The user terminal 3 accesses the EMD server 5 via the Internet 4 based on this EMD link, and requests a decoding key to decode the compressed encoded data.

When the EMD server 5 receives a request for a decoding key from the user terminal 3, it performs the necessary accounting, and then transmits the decoding key to the user terminal 3 via the Internet 4. The user terminal 3 receives the decoding key from the EMD server 5, and decodes the compressed encoded data to full song data (which had been compressed) using the decoding key. In this way, the user can acquire the full song data.

The EMD server 5, apart from managing the full song data and providing the decoding key to the user terminal 3 as stated hereabove, also provides song data to be transmitted as actual broadcast data or compressed and encoded to the transmitting station (transmitting device 1). The EMD server 5 also performs accounting for collecting the cost of providing the decoding key (and ultimately, full song data). Due to this accounting, the purchase price of the full song data is later deducted from the user's bank account or credit company, or the invoicing may be performed using a prepaid card.

It may occur that, due to the transmitting capacity of the transmitting medium 2, all the aforementioned data cannot be included in the data broadcast data. In this case, it is not included in the data for data broadcasting. When the compressed encoded data is not included in the data broadcast data, the user terminal 3 requests the decoding key and the compressed encoded data to be decoded by the decoding key from the EMD server. The EMD server 5 then transmits the decoding key and compressed encoded data to the user terminal 3.

The data broadcast data may contain a still picture coupon which is treated as a "coupon". This still picture coupon may for example be requested from the user terminal 3 when the decoding key is requested, and transmitted to the EMD server 5 with the request. In the EMD server 5, when a still picture coupon is received with a request for a decoding key, a discount is given on the price when accounting is performed.

Although accounting was performed by the EMD server 5 in the aforementioned case, an accounting server 6 which performs only accounting may be provided as shown by the dotted line in FIG. 1, and accounting performed by the accounting server 6.

If the data broadcast data does not contain compressed encoded data (or even if it does), a transfer device which transfers the compressed encoded data and decoding key, may be installed in a shop or other location, for example, a record store, a video shop, a convenience store or a railway station shop. In this case, if the user goes to the location where the transmitting unit is installed, he can acquire the compressed, encoded data and decoding key in exchange for money.

The dealer (for example, the shop name and branch name, etc.) which sells the CD on which the songs broadcast in the actual broadcast were recorded can be listed. In this case, the EMD link can be displayed (output) by the user terminal 3, so the user can recognize the dealer which sells the CD on which the song he wants is recorded, and go to purchase the CD (access the dealer's shop).

Figure 2:
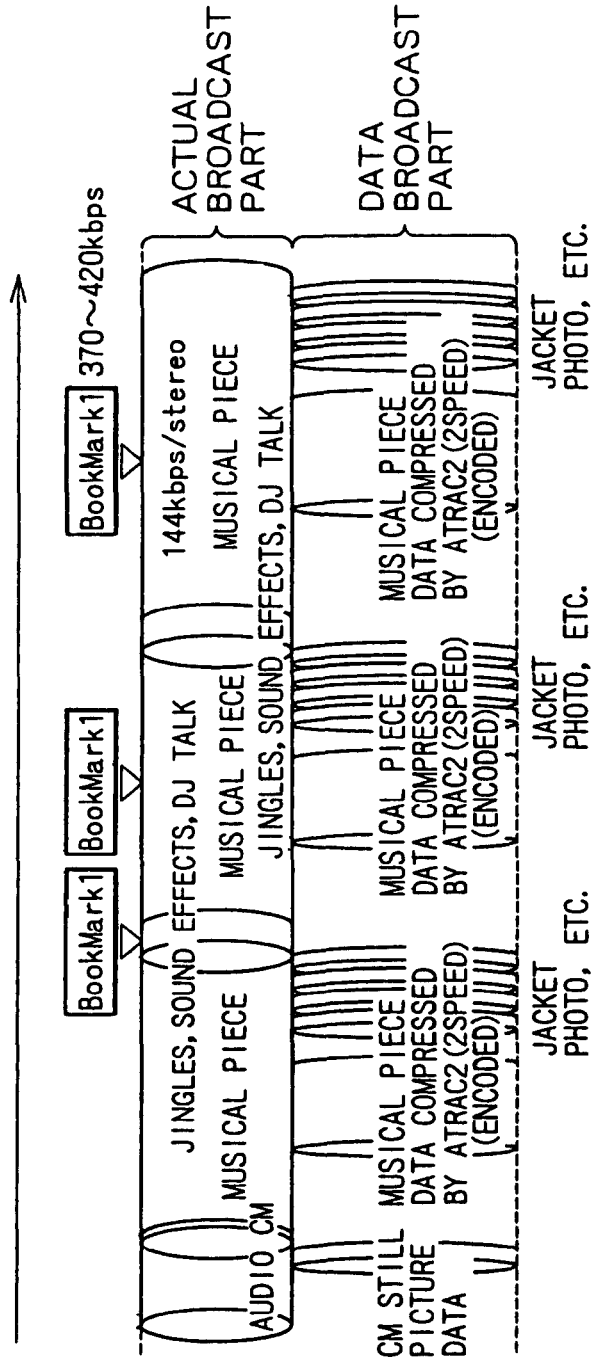
FIG. 2 is a drawing showing a transfer format for actual broadcast data and data broadcast data.

Next, FIG. 2 shows the transfer format of the actual broadcast data and data broadcast data transmitted by the transmitting device 1 in FIG. 1. Herein, in Japan, it is expected that in digital radio broadcasting, about 400 kbps (kilobit per second) will be taken as one segment, and that the audio compression used will be MPEG (Moving Picture Experts Group) AAC (Advanced Audio Coding). FIG. 2 shows the transfer format if this type of digital radio broadcasting is employed.

In FIG. 2, the actual broadcast data is MPEG AAC, and is compressed into and transmitted as an approximately 128 kbps to 144 kbps stereo signal. Moreover, in the data broadcast data, the compressed encoded data is obtained by compressing full song data by ATRAC (Adaptive Transform Acoustic Coding) 2, and then encoded by a predetermined system. The transfer rate is of the order of 250 kbps.

Figure 3:
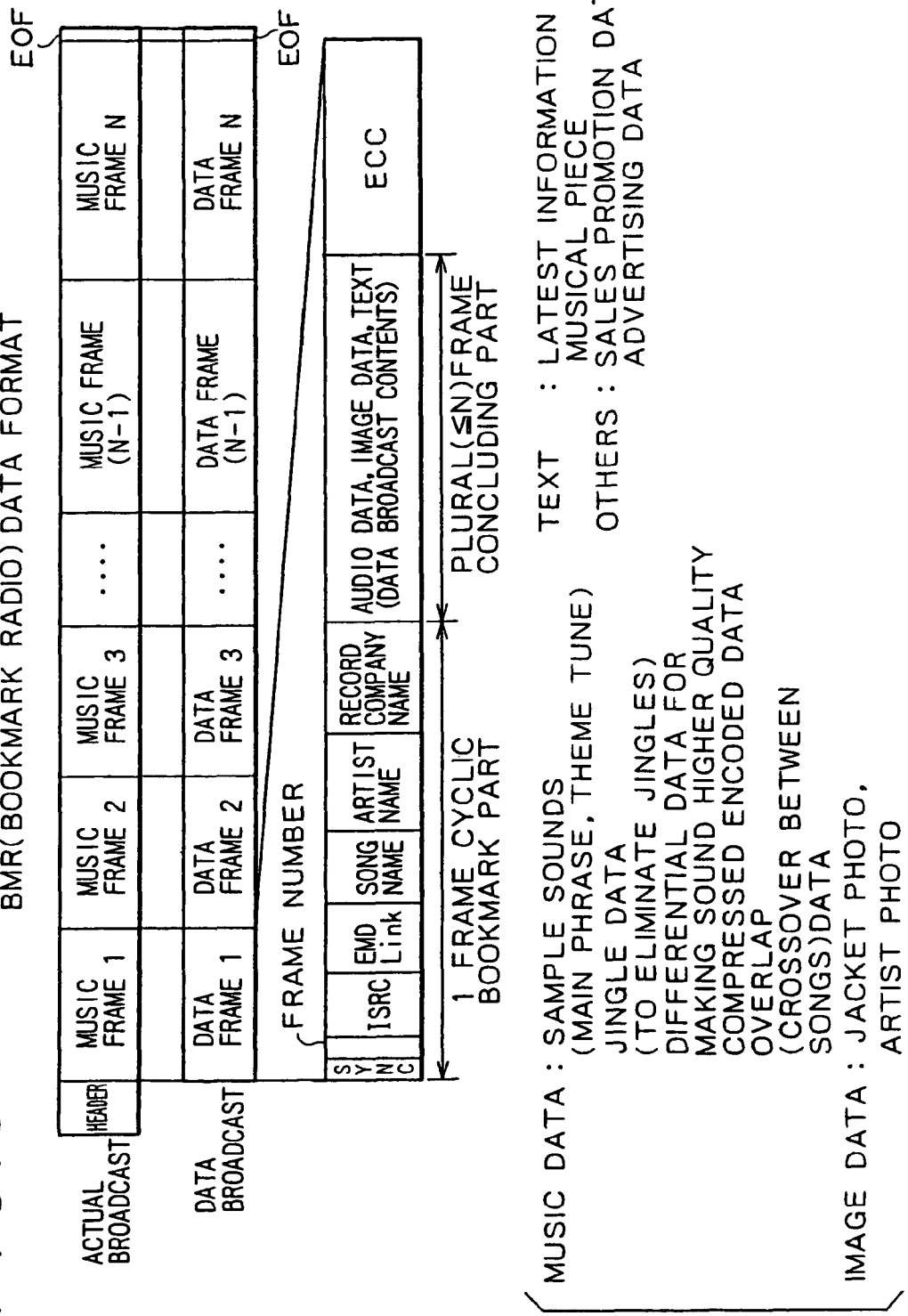
FIG. 3 is a drawing showing a data format for actual broadcast data and data broadcast data.

Next, FIG. 3 shows the data format of this actual broadcast data and data broadcast data.

This actual broadcast data and data broadcast data are in predetermined frame units, and each frame is transmitted with time synchronization.

The frames of this actual broadcast data or data broadcast data will be referred to hereafter for convenience as music frames or data frames.

If the time from the start of transmission to the end of transmission of a certain song is one program, in the actual broadcast data of one program, the required number of music frames is disposed after a header, and an EOF (End of File) is disposed at the end. Also, in the data broadcast data of the program, there are an identical number of data frames to that of the music frames forming the actual broadcast data, and an EOF is placed at the end. The music frames and corresponding data frames are synchronized and transmitted simultaneously.

From the beginning, the data frames contain a sync (synchronizing signal) used for detecting the data frame, and frame numbers are appended, for example sequentially, to each frame. In one program broadcast, a frame cyclic bookmark part (referred to hereafter for convenience as bookmark part) comprising data which are transmitted periodically, a plural frame concluding part (referred to hereafter for convenience as concluding part) comprising concluding data, basically comprising plural data frames grouped together, and an ECC (Error Correcting Code or Error Checking Code) for error correction or detection, are disposed in sequence.

The bookmark part comprises information necessary to acquire the full song data of the song broadcast by the actual broadcast (acquiring information). This may be for example a 60 bit ISRC (International Standard Recording Code) as unique information attached to the full song data of the songs in the actual broadcast. The bookmark part further comprises, for example, the name of the song (title), name of the singer (artiste's name), and name of the record company (producer) to which the singer belongs (record company name) as recognizing information useful to recognize the full song data of the songs broadcast in the actual broadcast. Still further, the bookmark part comprises an EMD link as access information used for accessing the locations at which the full song data of the song broadcast by this broadcast is provided (such as the EMD server 5 shown in FIG. 1, or the dealer who sells the CD on which the full song data were recorded).

The bookmark part of each of the data frames which constitute one program contains identical information, therefore, and unless the program of this broadcast is terminated in a very short time, the information in the bookmark part is periodically transmitted on plural occasions.

The concluding part comprises, for example, the following audio data, picture data, text data and other data.

The audio data for example comprises compressed encoded data obtained by compressing the aforementioned full song data and sample sounds. The audio data may also comprise jingle data, an announcer's voice, differential data to improve audio quality and overlap data, as described later.

The picture data comprises for example a jacket photo on the CD on which the full song data were recorded, photos of the singer singing the songs (artiste's photo) and still picture coupon data, etc.

The text data comprises, for example, the song title or singer's name which is useful to recognize the full song data, the record company's name, and stories and the latest information about the singer. Therefore, according to this embodiment, the bookmark part and concluding part may both comprise the song titles and the singer's name although this is somewhat redundant.

Other data may be data relating to sales promotions or advertising data.

Herein, the data in the bookmark part or concluding part will be referred to hereafter for convenience as bookmark data or data broadcast contents, respectively.

In FIG. 3, there is one channel for data broadcasting, however two channels may be used for data broadcasting instead. In this case, the data in the bookmark part may be disposed in one of these channels and the data broadcast contents in the concluding part may be disposed in the other channel, and both channels transmitted simultaneously.

Figure 4:
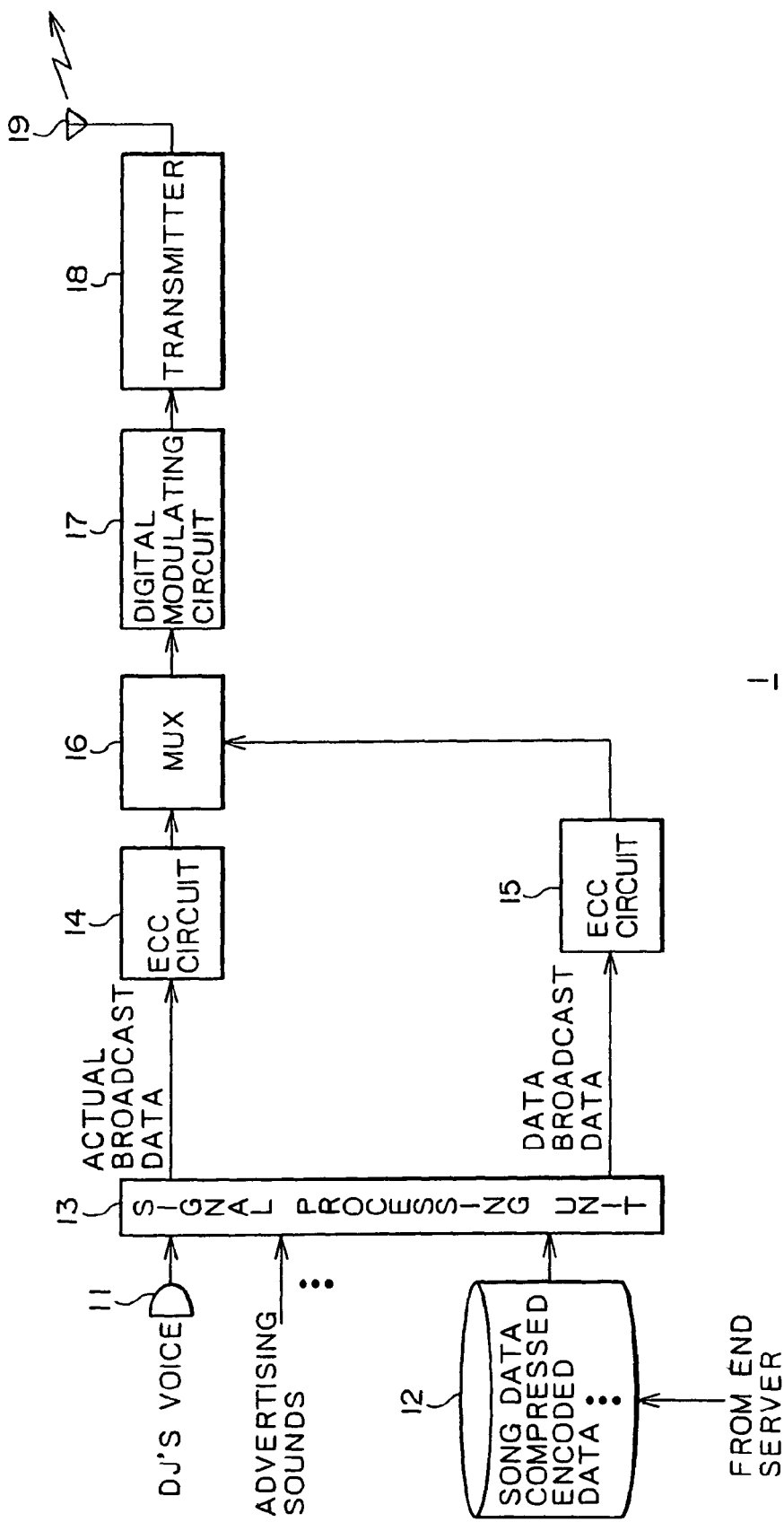
FIG. 4 is a block diagram showing an example of a transmitting device 1 in FIG. 1.

Next, FIG. 4 shows an example of the construction of the transmitting device 1 which constitutes the broadcasting station of FIG. 1.

The announcer's voice (DJ (disc jockey's) voice) is input into a microphone 11. The DJ's voice is converted into an electrical audio signal and supplied to a signal processing unit 13. Data stored in a storage 12 are also supplied to the signal processing unit 13.

Song data used in the actual broadcast (this may be full song data), compressed encoded data used for data broadcasting or jacket photos are supplied from the EMD server 5 and stored in the storage 12. These data are supplied to the signal processing unit 13 as necessary.

Advertisements or "commercial" sounds used in the actual broadcast are also supplied to the signal processing unit 13.

In the signal processing unit 13, signal processing of the supplied data is carried out, and the music frames in the actual broadcast data and data frames in the data broadcast data are thereby generated. The music frames of the actual broadcast data and the data frames of the data broadcast data are respectively supplied to ECC circuits 14 or 15, an ECC is added, and the result is supplied to a MUX (multiplexer) 16.

In the MUX 16, the actual broadcast data and data broadcast data are multiplexed, and the multiplexed data obtained as a result are supplied to a digital modulating circuit 17. In the digital modulating circuit 17, digital modulation processing, such as for example QPSK (Quadrature Phase Shift Keying) or QAM (Quadrature Amplitude Modulation) is performed on the multiplexed data from the MUX 16, and the modulated signal obtained as a result is supplied to a transmitter 18. In the transmitter 18, amplification and other required processing is performed on the modulated signal from the digital modulating circuit 17, and the result is transmitted as a radio wave from an antenna 19.

Next, FIG. 5 shows an example of the construction of the user terminal 3 of FIG. 1.

The aforementioned radio wave transmitted from the transmitting device 1 is received by an antenna 21, and the received signal is supplied to a digital radio tuner 22. The digital radio tuner 22 receives the signal from the antenna 21, detects a signal in a predetermined channel according to the control of a reception control unit 22A, and supplies the result to a digital demodulating circuit 23. The digital demodulating circuit 23 performs digital demodulation on the output of the digital radio tuner 22, and the multiplexed data obtained as a result are output to a DMUX (demultiplexer) 24.

The demultiplexer 24 separates the multiplexed data from the digital demodulating circuit 23 into actual broadcast data and data broadcast data. These actual broadcast data or data broadcast data are respectively supplied to the ECC circuits 25 or 26. The ECC circuits 25 or 26 perform error detection or correction on the actual broadcast data or data broadcast data, and supply the result to a signal processing unit 27.

The ECC circuit 26 processes the data broadcast data from the DMUX 24 after temporarily storing it in a RAM 26. The RAM 26A has a storage capacity which can store data of, for example, at least one data frame (FIG. 3). Whenever a new data frame is received from the DMUX 24, the oldest data frame is erased (the oldest data frame is updated by the new data frame).

For example, when the user is carrying the user terminal 3, or when the user terminal 3 is mounted in an automobile, reception of the radio wave from the transmitting device 1 may be temporarily interrupted in a tunnel, etc. Even in such a case, in the user terminal 3, the RAM 26A stores the data broadcast data temporarily so that the data in the bookmark part of a data frame can be utilized. Further, as error detection or correction is performed on the data in the bookmark part of the data frame even in such a case, error-free data may be used.

The question of whether or not reception of the radio wave from the transmitting device 1 has been temporarily interrupted may be determined by, for example, determining whether or not the frame numbers (FIG. 3) of data frames are continuous or whether or not an EOF was received, or alternatively it may be based on the level of the radio wave.

Also, in the aforementioned case, error detection or correction was performed by the ECC circuit 26 after temporarily storing the data broadcast data from the DMUX 24 in the RAM 26A, but the data broadcast data may be temporarily stored in the RAM 26A after error detection or correction is performed by the ECC circuit 26.

In the signal processing unit 27, predetermined signal processing is performed on the actual broadcast data or data broadcast data from the ECC circuits 25 or 26. The actual broadcast data are then supplied to a D/A (Digital/Analog) converter 28, and after D/A conversion, the result is supplied and output to a speaker 29.

Of the data broadcast data, data which can be output as sound are also output from the speaker 29 as necessary in the same way as actual broadcast data.

Moreover, of the data broadcast data, data which can be displayed are as supplied as necessary to the display device 30.

In predetermined cases, the control unit 31 is operated by the user. An operating signal corresponding to the operation of the control unit 31 is supplied to the signal processing unit 27, and the signal processing unit 27 performs predetermined processing corresponding to this operation signal. That is, when the control unit 31 is operated for example to request a decoding key, the signal processing unit 27 controls a modem 32 so as to establish a link to the EMD server 5 via the Internet 4, and request the decoding key. The signal processing unit 27 then receives the decoding key transmitted from the EMD server 5 via the modem 32 in accordance with the request.

Figure 6:
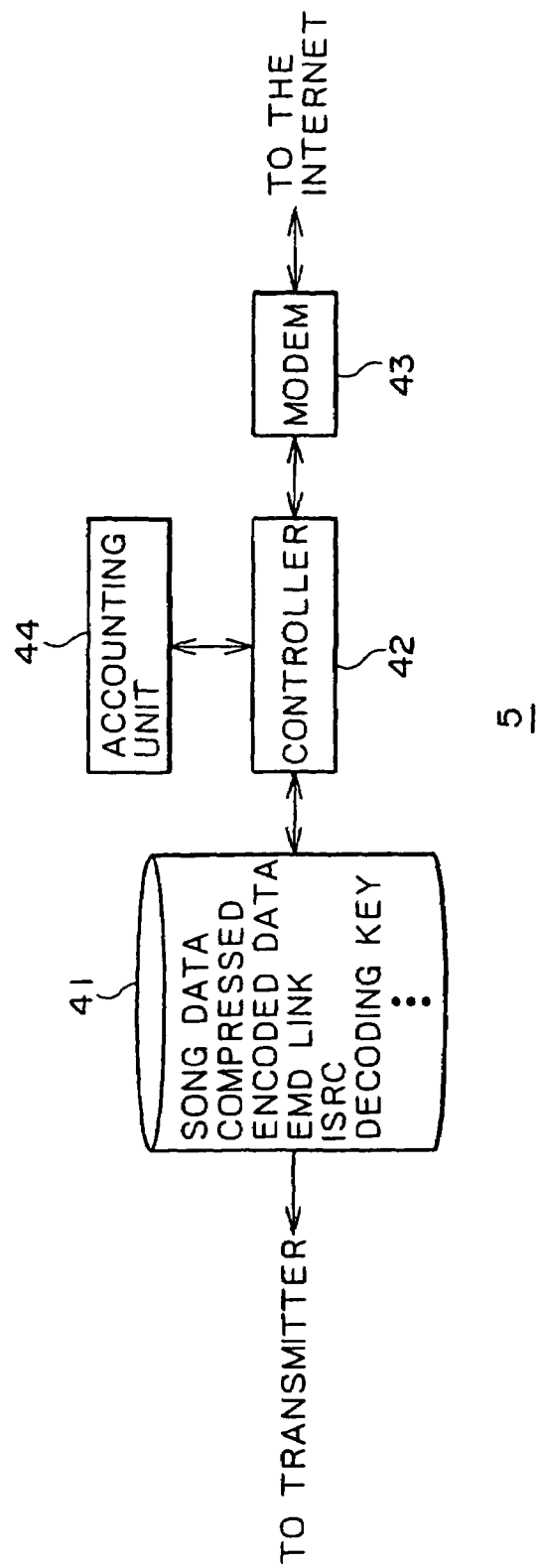
FIG. 6 is a block diagram showing an example of an EMD server 5 in FIG. 1.

Next, FIG. 6 shows an example of the construction of the EMD server 5 of FIG. 1.

A database 41 stores the full song data for the songs which the EMD service operator manages or ISRC, jacket photo data, artiste photo data, compressed encoded data for the full song data and the decoding key used to decode the data, and data used for the actual broadcast and data broadcast are supplied to the transmitting device 1 of the broadcasting station.

A modem 43 performs communication control via the Internet 4, and when a request for a decoding key is received from the user terminal 3, it is supplied to a controller 42. When the controller 42 receives the request for a decoding key, it performs accounting by controlling the accounting unit 44. The controller 42 also reads the requested decoding key from the database 41, and transmits it to the modem 43. If the controller 42 receives a request for compressed encoded data together with the request for a decoding key, this compressed encoded data is also read from the database 41 and transmitted to the modem 43.

Next, FIG. 7 shows an example of the construction of the signal processing unit 13 in the transmitting device 1 of FIG. 4.

The DJ's voice from the microphone 11 (FIG. 4) is supplied to an amplifier 51. The amplifier 51 amplifies the audio signal and supplies it to an A/D (Analog/Digital) converter 52. The A/D converter 52 performs A/D conversion on the analog voice signal from the amplifier 51 to convert it to digital audio data, and this is supplied to a mixer 53. In addition to the DJ's voice, data such as songs in the actual broadcast data, advertisements and jingles (herein, digital data), are also supplied to the mixer 53. The mixer 53 mixes these sounds so as to construct the actual broadcast data, and this is supplied to a data compression unit 54. The data compression unit 54 compresses the output of the mixer 53, for example by the MPEG scheme, and supplies the result to a synchronizing circuit 55.

In addition to actual broadcast data from the data compression unit 54, bookmark data and the output of the MUX 58 are also supplied to the synchronizing circuit 55. The synchronizing circuit 55 constructs data broadcast data from the bookmark data and the output of the MUX 58. It also constructs music frames containing the actual broadcast data and data frames containing the data broadcast data, synchronizes these data, and outputs them.

In addition, the synchronizing circuit 55 comprises a memory 55A. The memory 55A temporarily stores bookmark data for one program (song).

The synchronizing circuit 55, by arranging bookmark data for a certain program stored in the memory 55A in the data frames of data broadcast data for this program, places identical bookmark data in the bookmark part of the data frames constituting this program.

Audio data (for example, the compressed encoded data or sample sounds described above) in the data broadcast contents are supplied to a data compression unit 56. The data compression unit 56 compresses the audio data supplied to it by, for example, the ATRAC 2 scheme, and supplies it to the MUX 58. In the audio data, the compressed encoded data, for example, has already been compressed by the ATRAC 2 scheme or the like. Audio data already compressed in this way passes through the data compression unit 56 and is supplied to the MUX 58 without further modification.

Image data in the data broadcast contents (for example, a jacket photo, artiste's photo or still picture coupon, etc.) are supplied to the data compression unit 57. The data compression unit 57 compresses the image data supplied to it by for example the JPEG (Joint Photographic Experts Group) scheme, and supplies the result to the MUX 58.

In addition to the output of the data compression units 56 and 57, text data and other data in the data broadcast contents are also supplied to the MUX 58. The MUX 58 multiplexes the data broadcast contents supplied to it, and supplies the result to the synchronizing circuit 55. The text data or other data may also be supplied to the MUX 58 after compression.

Next, the processing of the signal processing unit 13 of FIG. 7 will be described referring to FIG. 8.

The DJ's voice from the microphone 11 is amplified by the amplifier 51, converted to a digital signal in the A/D converter 52, and supplied to the mixer 53. In addition to the DJ's voice, other data such as the songs which comprise actual broadcast data, advertisements and jingles are also supplied to the mixer 53, and mixed therein to form the actual broadcast data which is supplied to the data compression unit 54. The data compression unit 54 compresses the actual broadcast data from the mixer 53, and supplies it to the synchronizing circuit 55.

In the data compression units 56 or 57, on the other hand, audio data and image data in the data broadcast contents are respectively compressed, and supplied to the MUX 58. In addition to the output of the data compression units 56 and 57, text data and other data in the data broadcast contents are also supplied to the MUX 58. Therein, these data are multiplexed, and the result is supplied to the synchronizing circuit 55.

In addition to the actual broadcast data and the output of the MUX 58, bookmark data for the actual broadcast data program is also supplied to the synchronizing circuit 55. The synchronizing circuit 55 constructs the data broadcast data from the bookmark data and the output of the MUX 58, synchronizes the music frames which form the actual broadcast data and the data frames which form the data broadcast data, and outputs them.

Figure 8:
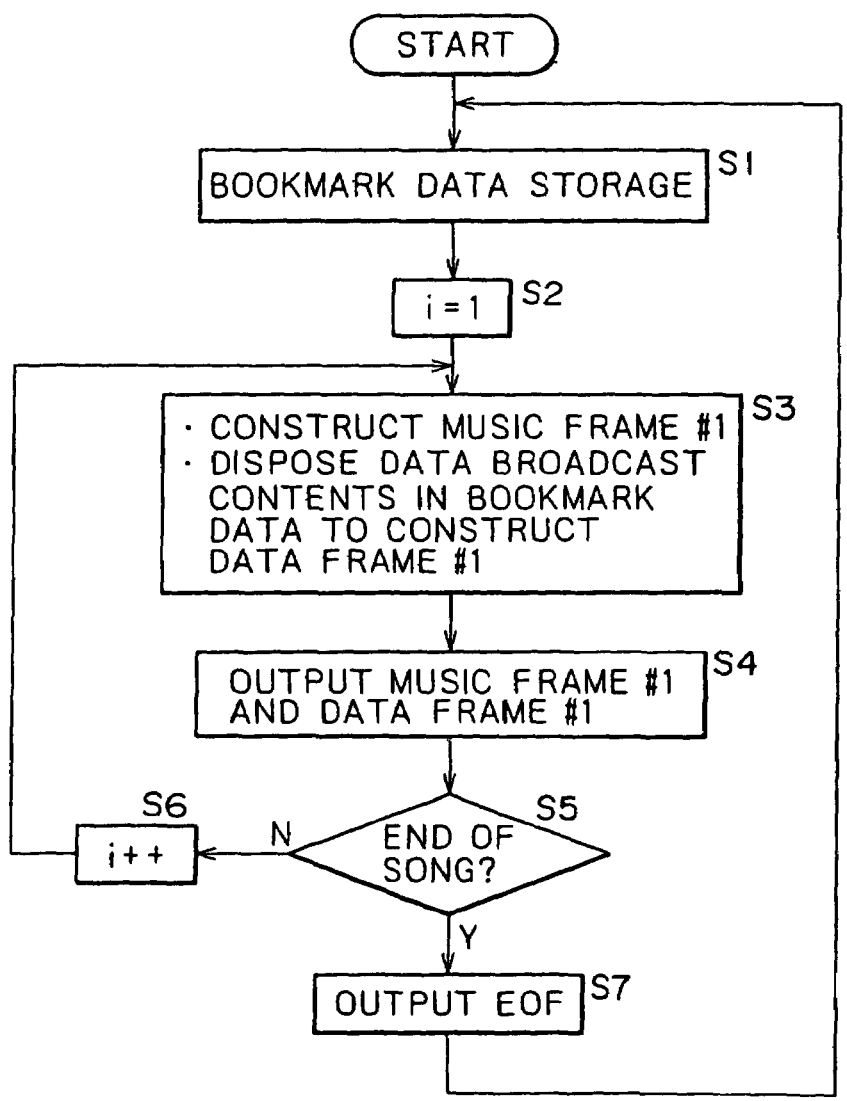
FIG. 8 is flowchart for describing the processing of a synchronizing circuit 55 in FIG. 7.

That is, when the synchronizing circuit 55 receives the bookmark data for a certain program, as shown in the flowchart of FIG. 8, the bookmark data is stored in the memory 55A in a step S1, the routine proceeds to a step S2, an initial value of, for example, 1 is set in a parameter i for counting the number of music frames constituting the program and the data frames, and the routine proceeds to a step S3.

In the step S3, a music frame #i is constructed using the actual broadcast data, a data frame #i is constructed by arranging a predetermined amount of the output data from the MUX 58 after the bookmark data stored in the memory 55A, and the routine proceeds to a step S4. In the step S4, the music frame #i and data frame #i are synchronized and output simultaneously, and the routine proceeds to a step S5.

In the step S5, it is determined whether or not the songs broadcast in the actual broadcast have finished. When it is determined that they have not yet finished, the routine proceeds to a step S6, and the parameter i is incremented by 1. The routine then returns to the step S3, and the same processing is repeated.

When it is determined in the step S5 that the songs broadcast in the actual broadcast have finished, an EOF is output as actual broadcast data and data broadcast data, the routine waits for the bookmark data for the next program to be supplied, and returns to the step S1.

Therefore, except for the special case where the program broadcast data finish in a very short time, bookmark data about the program are periodically transmitted while actual broadcast data for the program is being transmitted by disposing it in the data frames. Consequently, in the user terminal 3, loss of bookmark data for a certain program is suppressed as far as possible.

Figure 9:
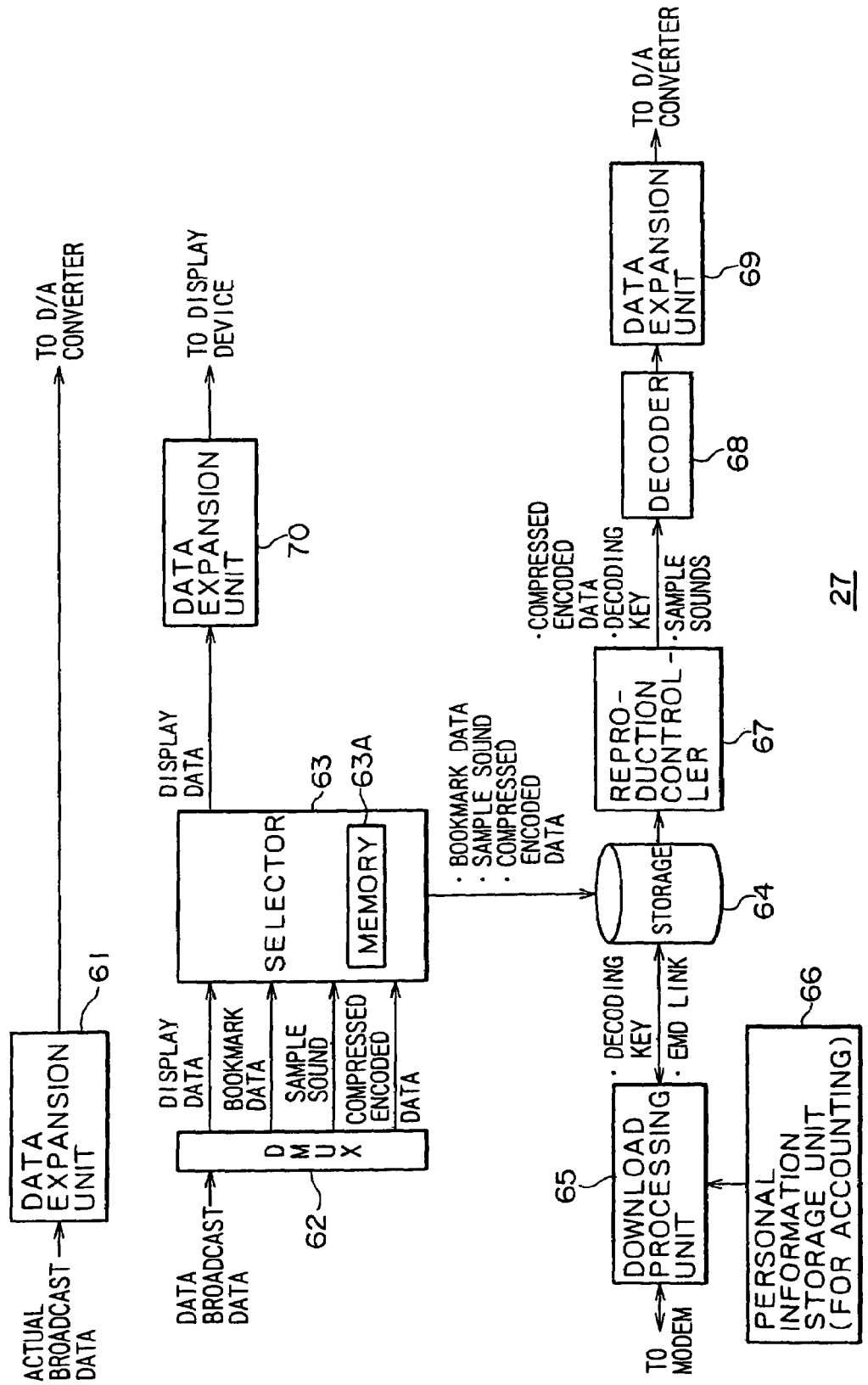
FIG. 9 is a block diagram showing a first example of the construction of a signal processing unit 27 in FIG. 5.

Next, FIG. 9 shows an example of the construction of the signal processing unit 27 in the user terminal 3 of FIG. 5.

Actual broadcast data from the ECC circuit 25 (FIG. 5) are supplied to a data expansion unit 61. The data expansion unit 61 expands this actual broadcast data, and supplies it to the D/A converter 28 (FIG. 5).

The data broadcasting data from the ECC circuit 26 (FIG. 5) are supplied to a DMUX 62. The DMUX 62 separates the data broadcasting data into bookmark data and data broadcast contents. Also, the DMUX 62 separates the data broadcast contents into data that can be displayed (referred to hereafter as display data for convenience), sample sounds, and compressed encoded data, etc., and supplies it to a selector 63 together with bookmark data.

The selector 63 comprises a memory 63A, and the output of the DMUX 63 is stored temporarily in the memory 63A. Also, the selector 63 selects some of the data stored in the memory 63A according to the operation of the control unit 31 (FIG. 5), and supplies it to the display device 30 (FIG. 5) via an expansion unit 70 or to a storage 64. Display data (e.g., song title (name of song), artiste name (name of singer) and jacket photo) are basically supplied to the display device 30, while bookmark data, sample sounds and compressed encoded data are basically supplied to the storage 64 respectively.

The storage 64 stores the bookmark data, sample sounds and compressed encoded data supplied from the selector 63. The storage 64 also stores the decoding key supplied from a download processing unit 65. Herein, the storage 64 may be built into the user terminal 3, but it may also for example comprise a memory card which can easily be fitted and removed. If the storage 64 is a memory card or the like, it can conveniently be brought to a dealer to receive compressed encoded data and its decoding key as described in FIG. 1.

When the control unit 31 is operated to request the download of a decoding key or compressed encoded data, the download processing unit 65 controls the modem 32 (FIG. 5) to request the download from the EMD server 5 via the Internet 4. A personal information memory unit 66 stores a user's name, address, telephone number, credit card number or bank account number as personal user information required for accounting which is performed when the decoding key or compressed encoded data is downloaded. This personal information is transmitted together with the request when the download processing unit 65 requests download of the decoding key or compressed encoded data.

A reproduction controller 67 reproduces the data stored by the storage 64, and supplies it to a decoder 68. When compressed encoded data and a decoding key are supplied from the reproduction controller 67, the decoder 68 decodes the compressed encoded data using the decoding key, and the compressed full song data which are obtained as a result are supplied to a data expansion unit 69. The decoder 68 also supplies sample sounds to the data expansion unit 69 without modification when sample sounds are supplied from the reproduction controller 67.

If the full song data and sample sounds supplied from the decoder 68 are compressed, the data expansion unit 69 expands the compressed full song data or sample sounds, and supplies them to the D/A converter 28 (FIG. 5). If the display data supplied from the selector 63 is compressed, the data expansion unit 70 expands the compressed display data, and supplies it to the display device 30. When the supplied data is not compressed, the data expansion units 69 and 70 output the data without modification.

Next, the processing of the signal processing unit 27 of FIG. 9 will be described referring to the flowchart of FIG. 10.

The actual broadcast data from the ECC circuit 25 is supplied to the data expansion unit 61. The data expansion unit 61 expands the actual broadcast data, and supplies it to the speaker 29 via the D/A converter 28. In this way, the actual broadcast is output from the speaker 29.

On the other hand, the data broadcasting data from the ECC circuit 26 is supplied to the DMUX 62, and is separated into bookmark data and data broadcast contents. Also, in the DMUX 62, the data broadcast contents are separated into display data, sample sounds and compressed encoded data, and supplied to the selector 63 together with bookmark data.

The selector 63 temporarily stores the data from the DMUX 63 in a memory 63A, and subsequently, the stored contents are progressively updated by data freshly supplied from the DMUX 63. Specifically, in the memory 63A, bookmark data is updated for example every data frame, and data broadcast contents are updated for example each time one song in the actual broadcast finishes.

As shown in the flowchart of FIG. 10, first in a step S11, it is determined whether or not the control unit 31 was operated to output display data. When it is determined that it was so operated, the routine proceeds to a step S12, the selector 63 reads the display data stored in the memory 63A, this data is supplied to the display device 30 via the data expansion unit 70, and the routine returns to the step S11. As a result, a jacket photo, artiste photo, title and singer's name, for example, are displayed by the display device 30 for the song currently being broadcast.

On the other hand, when it is determined in the step S11 that the control unit 31 was not operated to output display data, the routine proceeds to a step S13, and it is determined whether or not the control unit 31 was bookmark operated. When it is determined in the step S13 that the control unit 31 was bookmark operated, i.e., when the user is interested in a song broadcast in the actual broadcast, and has performed an operation to attach a "mark" to this song, the routine proceeds to a step S14, the selector 63 reads bookmark data, sample sounds and compressed encoded data stored in the memory 63A, supplies them to the storage 64 where they are stored, and the routine returns to the step S11. In this way, bookmark data, sample sounds and compressed encoded data for a particular song broadcast during the actual broadcast when the control unit 31 is bookmark operated, are stored (recorded) in the storage 64.

Herein, as described above, the data broadcast contents are updated whenever one song of the actual broadcast is finished, so if the control unit 31 was bookmark operated, sample sounds and compressed encoded data for one song are retained in the storage 64 while that song is being broadcast, but if the control unit 31 was not bookmark operated, this data is erased from the user terminal 3.

When it is determined in the step S13 that the control unit 31 was not bookmark operated, the routine proceeds to a step S15, and it is determined whether or not the control unit 31 was operated to output sample sounds. When it is determined in the step S15 that the control unit 31 was operated to output sample sounds, the routine proceeds to a step S16, the reproduction controller 67 reads sample sounds stored in the storage 64 therefrom, the sample sounds are supplied to the speaker 29 via the decoder 68, data expansion unit 69 and D/A converter 28, and the routine returns to the step S11. As a result, the sample sounds are output from the speaker 29.

Herein, even if compressed encoded data for a certain song is stored in the storage 64 due to the control unit 31 performing a bookmark operation, the user may forget what the song was. In such a case, the user can remember the song by reproducing and listening to a sample sound as described hereabove.

On the other hand, when it is determined in the step S15 that the control unit 31 was not operated to output sample sounds, the routine proceeds to a step S17, and it is determined whether or not the control unit 31 was downloaded operated to request download of a decoding key. When it is determined in the step S17 that the control unit 31 was download operated, the routine proceeds to a step S18, and the download processing unit 65 performs download processing of the decoding key.

If, in the EMD server 5, there is a file of a decoding key of compressed encoded data for certain full song data, the ISRC of the full song data is taken as a file name, and an EMD link of the bookmark data represents the host name of the EMD server 5 which manages the full song data, the download processing unit 65 will take the EMD link of the bookmark data stored in the storage 64 as the host name, and will construct a URL wherein the ISRC is a file name. The download processing unit 65 will also control the modem 32 based on this URL, establish a communication link with the EMD server 5, read personal information from the personal information storage unit 66, request the decoding key, and transmit this information and request to the EMD server 5.

When the request for the decoding key and the personal information are received, the EMD server 5 performs accounting based on the personal information, and transmits the requested decoding key to the user terminal 3. The decoding key thus transmitted from the EMD server 5 to the user terminal 3 is received by the download processing unit 65 via the modem 32.

When the download processing unit 65 receives the decoding key, the routine proceeds to a step S19, the decoding key is stored in the storage 64, and the routine returns to the step S11.

When the control unit 31 was download operated and bookmark data was not stored in the storage 64, instead of performing the processing of the steps S18, S19 in the user terminal 3, a notice to this effect may for example be output from the speaker 29 or displayed by the display device 30.

On the other hand, when it is determined in the step S17 that the control unit 31 was not download operated, the routine proceeds to a step S20, and it is determined whether or not the control unit 31 was operated to reproduce a song (hereafter referred to as a reproduction operation for convenience). When it is determined in the step S20 that the control unit 31 was reproduction operated, the routine proceeds to a step S21, reproduction of the song by the reproduction controller 67 begins, and the routine returns to the step S11.

In other words, the reproduction controller 67 reads the compressed encoded data and the decoding key stored in the storage 64 therefrom, and supplies them to the decoder 68. The decoder 68 decodes the compressed encoded data from the reproduction controller 67 using the decoding key from the reproduction controller 67, and supplies the decoded data to the data expansion unit 69. In the data expansion unit 69, the decoded data from the decoder 68 is expanded to full song data which is supplied to the speaker 29 via the D/A converter 28. As a result, the same song is reproduced from the speaker 29 as in the case of playing back a CD.

In addition, the data decoded in the decoder 68, and the data expanded in the data expansion unit 69 can be output from an output terminal, not illustrated, and recorded by a recording device, also not illustrated.

On the other hand, when it is determined in the step S20 that the control unit 31 was not reproduction operated, the routine returns to the step S11.

When the control unit 31 was reproduction operated and compressed encoded data or a decoding key was not stored in the storage 64, in the user terminal 3, a notice to this effect may for example be output from the speaker 29 or displayed by the display device 30 instead of performing the processing of the step S21.

When the control unit 31 was reproduction operated and compressed encoded data or a decoding key is stored in the storage 64, (as when the control unit 31 is operated to output sample sounds and plural sample sounds are stored in the storage 64), a list of titles or singers' names corresponding to this plural compressed encoded data is displayed on the display device 30 so the user can choose which of the compressed encoded data to reproduce. The titles of songs corresponding to the compressed encoded data can be recognized by referring to the bookmark data stored in the storage 64.

As described hereabove, in the transmitting device 1, bookmark data required for acquiring the decoding key for decoding the compressed encoded data of a song broadcast in the actual broadcast are disposed to form data broadcasting data, and the data broadcasting data containing the bookmark data required to acquire the decoding key for decoding the compressed encoded data of the song in the actual broadcast are transmitted on plural occasions while the actual broadcast data is being transmitted. The actual broadcast data and data broadcast data are received by the user terminal 3, and when the control unit 31 is bookmark operated, the bookmark data contained in the data broadcast data is stored in the storage 64.

Therefore, the user can easily receive full song data about a desired song.

In the aforementioned case, compressed encoded data were broadcast in the data broadcast, and the decoding key used for decoding was requested from the EMD server 5. However, it is possible to request a set of the compressed encoded data and the decoding key for decoding the compressed encoded data from the EMD server 5 without broadcasting the compressed encoded data in the actual broadcast (although it may be so broadcast). Alternatively, full song data which is not encoded may be requested from the EMD server 5.

Next, in the aforementioned case, full song data were offered by data broadcasting and the EMD server 5 separately from the actual broadcast data, but full song data can be provided also by using the actual broadcast data.

Specifically, the compressed encoded data broadcast by data broadcasting in the aforementioned case are obtained by compressing and encoding full song data, and this full song data is broadcast in the actual broadcast. However, if the full song data (first signal) is as shown for example in FIG. 11A, in the actual broadcast, the actual broadcast data shown in FIG. 11C, which is obtained for example by superimposing what may be considered to be "noise" (second signal) from the viewpoint of the full song data, such as the DJ's voice, narration, jingles, sound effects or advertisements shown in FIG. 11B on the beginning part or end part, is often broadcast.

Therefore, if the DJ's voice or jingles, etc., which is noise from the viewpoint of the full song data shown in FIG. 11D which is identical to FIG. 11B, in the actual broadcast data are included in data broadcast data as "full song data generating data", the full song data may be obtained (generated) using this generating data and the actual broadcast data.

Figure 12:
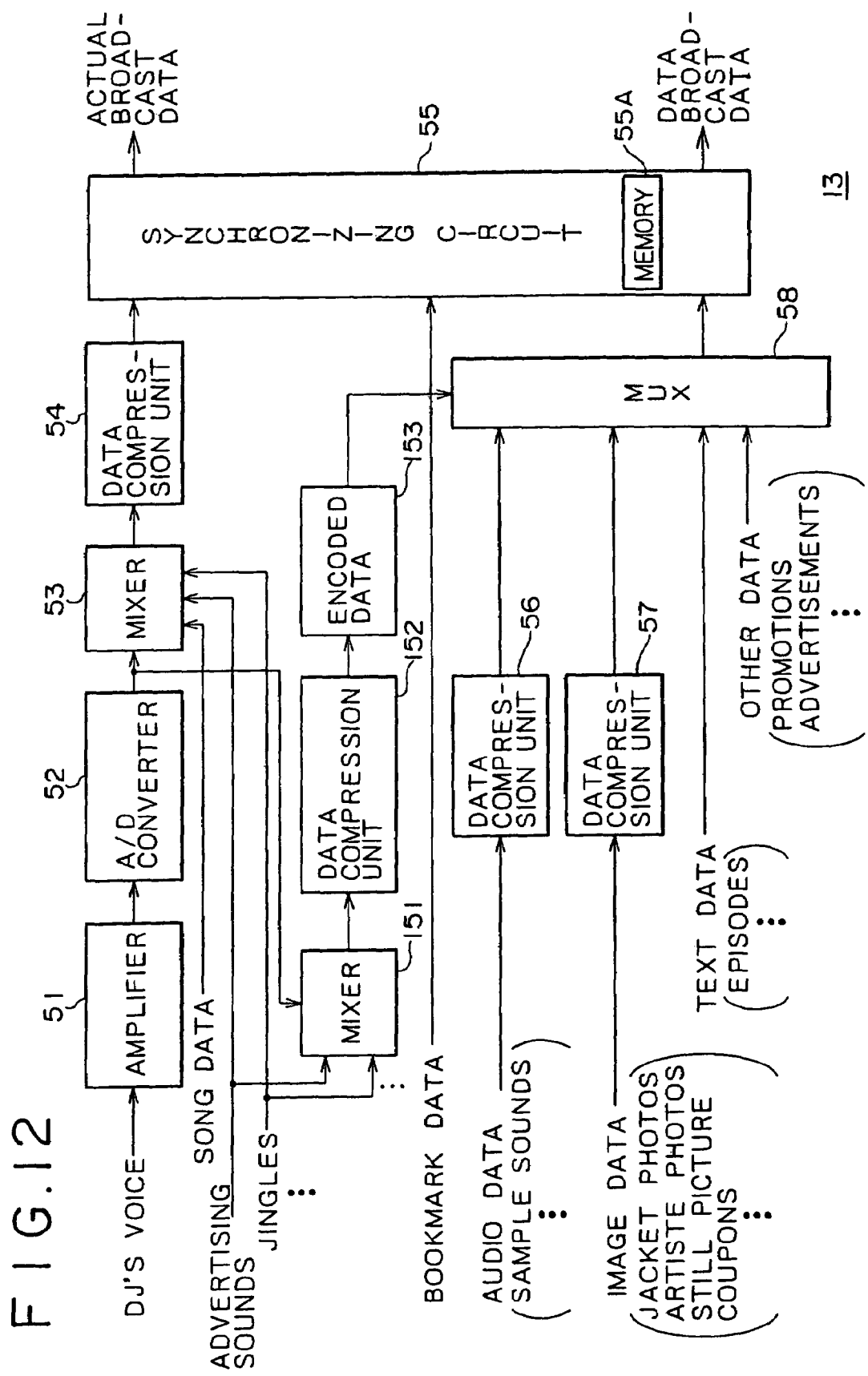
FIG. 12 is a block diagram showing a second example of the construction of the signal processing unit 13 in FIG. 4.

In this case, the signal processing unit 13 of the transmitting device 1 (FIG. 4) is comprised, for example, as shown in FIG. 12. In the figure, parts corresponding to the case in FIG. 7 are assigned the same symbols and their description is omitted herebelow. Specifically, except for the provision of a mixer 151, data compression unit 152 and encoding unit 153 in the signal processing unit 13 of FIG. 12, the arrangement is basically the same as that of FIG. 7.

Jingles, advertisements and the DJ's voice output by the A/D converter 52 which are also included in the actual broadcast data apart from full song data and which are noise from the viewpoint of full song data, are input into the mixer 151 as generating data. In the mixer 151, the generating data supplied to it is mixed, and supplied to the data compression unit 152. In the data compression unit 152, the generating data is compressed and supplied to the encoding unit 153. In the encoding unit 153, the generating data output by the data compression unit 152 is encoded, and supplied to the MUX 58.

In the signal processing unit 13 of FIG. 12, apart from the presence of the generating data which the encoding unit 153 outputs instead of the compressed encoded data in the (data broadcast contents of the) data broadcast data, the actual broadcast data and data broadcast data are constructed and output as in the case described in FIG. 7.

Next, FIG. 13 shows an example of the construction of the signal processing unit 27 of the user terminal 3 (FIG. 5) when generating data is contained in the data broadcast data. Regarding parts of the figure that have the same construction as that of FIG. 9, the same symbols are assigned and their description is herebelow omitted for convenience. That is, except for the provision of the memory 161 and computing unit 162, the signal processing unit 27 of FIG. 13 basically has the same construction as that of FIG. 9.

The memory 161 temporarily stores the actual broadcast data output by the data expansion unit 61 outputs. When the memory 161 has no further storage capacity, the most recent actual broadcast data is stored by, for example, overwriting the oldest broadcast data. Storage and erasure of actual broadcast data in the memory 161 is performed in song (program) units.

On the other hand, in the DMUX 62, the data broadcast data supplied to it are separated into bookmark data and data broadcast contents. Further, in the DMUX 62, the data broadcast contents are separated into display data, sample sounds and generating data, etc., and are supplied to the selector 63 together with bookmark data.

The selector 63 temporarily stores the data from the DMUX 63 in the memory 63A, and the stored contents are progressively memory updated by new data from the DMUX 63.

When the control unit 31 is bookmark operated, the selector 63 reads the bookmark data and sample sounds which were stored by the memory 63A, and supplies them to the storage 64, as mentioned above. The selector 63 also reads generating data contained in the data broadcast contents instead of compressed encoded data from the memory 63A, and supplies this also to the storage 64 where it is stored. Further, when the control unit 31 is bookmark operated, the selector 63 reads the actual broadcast data which was being stored in the memory 161 after waiting for the song to finish (after waiting for one song of the actual broadcast data to be stored in the memory 161), and supplies it to the storage 64 where it is stored.

Subsequently, when the control unit 31 is download operated, the download processing unit 65 accesses the EMD server 5 as in the case of FIG. 9 based on the EMD link in the bookmark data stored by the storage 64, and requests the decoding key for decoding the generating data stored by the storage 64. The EMD server 5 transmits the decoding key according to this request, this decoding key is received in the download processing unit 65 and stored by the storage 64. Herein, it is assumed that the decoding key for decoding the data encoded in the encoding unit 153 of FIG. 12 is stored in the EMD server 5.

When the control unit 31 is reproduction operated, the reproduction controller 67 reads the generating data stored in the storage 64 therefrom, and supplies it to the decoder 68. The decoder 68 likewise decodes the generating data from the reproduction controller 67 using the decoding key from the reproduction controller 67, and supplies the decoded data to the data expansion unit 69. In the data expansion unit 69, the decoded data from the decoder 68 is expanded to full generating data, and supplied to the computing unit 162.

The reproduction controller 67 also reads the actual broadcast data stored in the storage 64 therefrom, and supplies it to the computing unit 162. The computing unit 162 generates the full song data shown in FIG. 11A by subtracting the generating data shown in FIG. 11D supplied from the data expansion unit 69, from the actual broadcast data shown in FIG. 11C supplied from the reproduction controller 67. This full song data is supplied to the speaker 29 via the D/A converter 28, and the same song as is obtained by, for example, playing a CD is output from the speaker 29.

Figure 14:
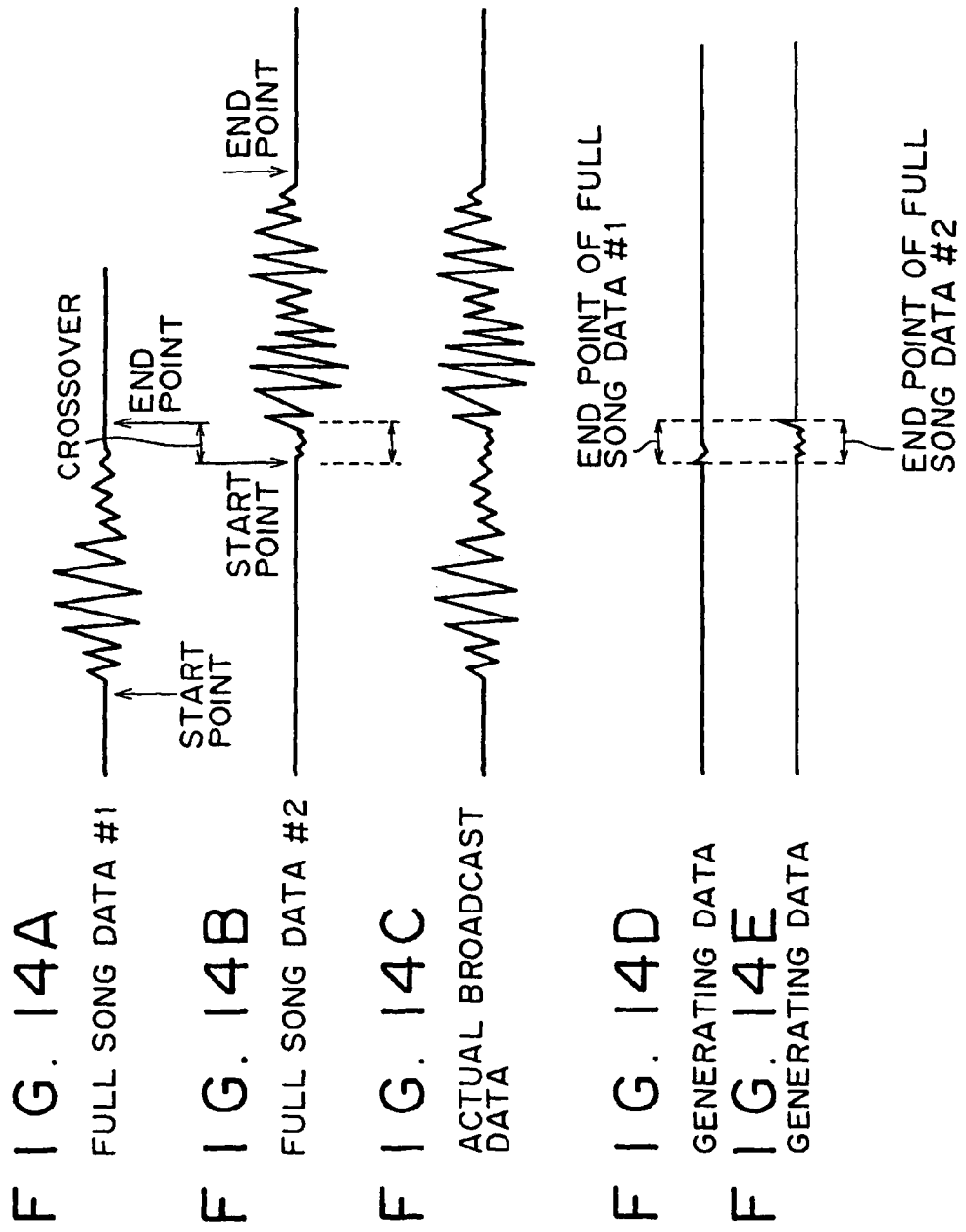
FIGS. 14A to 14E are a figure for describing a method of providing full song data using actual broadcast data.

Next, in this actual broadcast, after broadcasting for example the full song data #1 shown in FIG. 14A, the full song data #2 shown in FIG. 14B may be broadcast, and in this case, transmission of the full song data #2 may start before transmission of the full song data #1 has finished. In this case, the actual broadcast data shown in FIG. 14C is transmitted wherein the end of the full song data #1 and the beginning of the full song data #2 overlap. In this actual broadcast data, the full song data #2 is noise from the viewpoint of the full song data #1, and conversely, the full song data #1 is noise from the viewpoint of the full song data #2. Therefore, if the overlapping parts of the full song data #1 or #2 respectively shown in FIG. 14D or FIG. 14E (referred to hereafter as overlapping parts for convenience) are included as generating data in the data broadcast data transmitted together with the actual broadcast data comprising the full song data #1 or #2, the full song data #1 and #2 can be obtained using this generating data and the actual broadcast data.

The full song data #1 can be obtained by replacing the overlapping part of the actual broadcast data of FIG. 14C by the overlapping part of the full song data #1 of FIG. 14D, or by subtracting the overlapping part of the full song data #2 of FIG. 14E from the overlapping part of the actual broadcast data of FIG. 14C. The same is true of the full song data #2.

Figure 15:
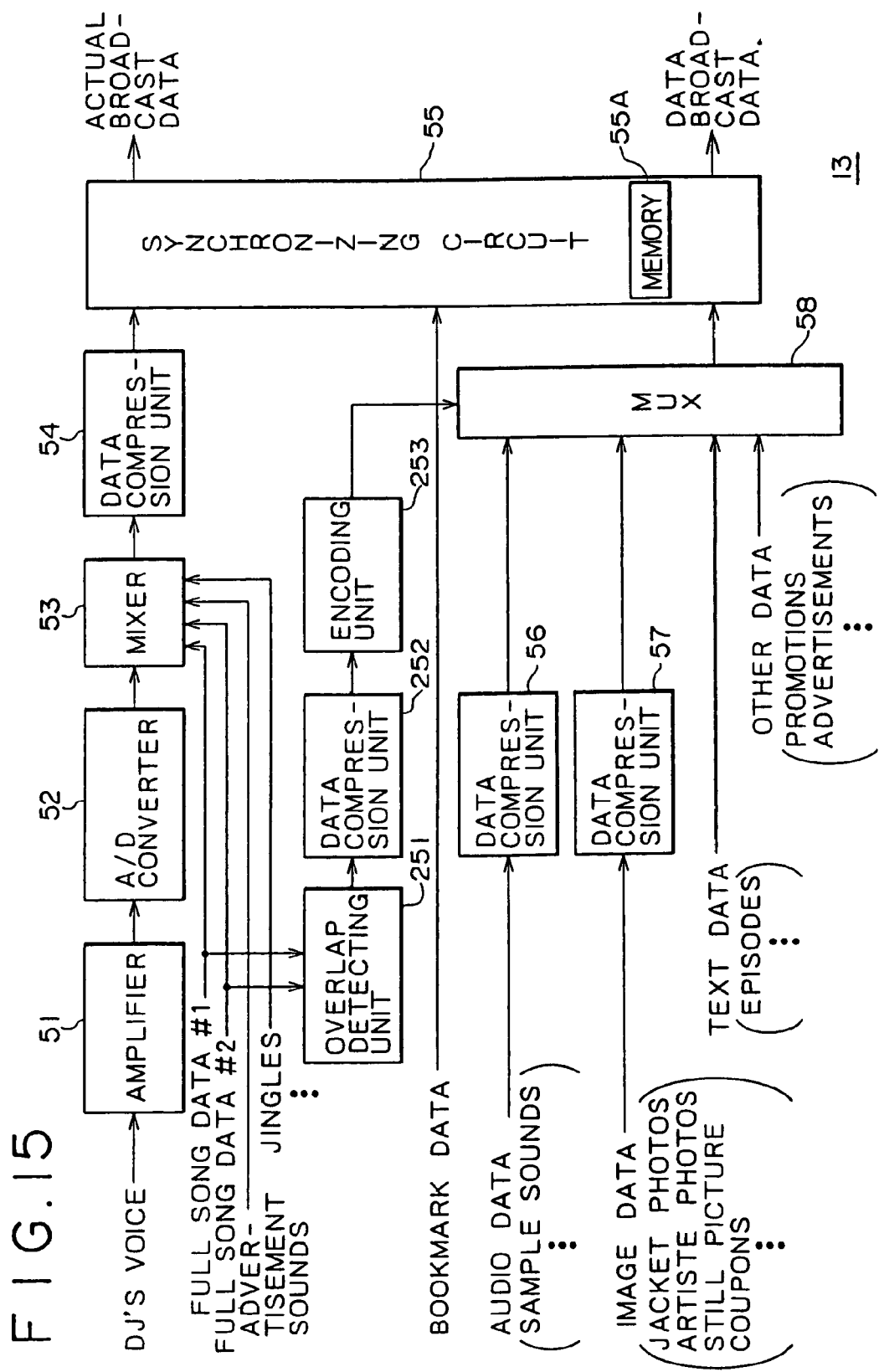
FIG. 15 is a block diagram showing a third example of the construction of the signal processing unit 13 in FIG. 4.

FIG. 15 shows an example of the construction of the signal processing unit 13 of the transmitting device 1 (FIG. 4) in the case where the overlapping parts described in FIGS. 14A to 14E are present in the actual broadcast data. In the figure, identical symbols are assigned to parts corresponding to the case of FIG. 7, and their description is herebelow omitted for convenience. That is, except for the provision of the overlap detecting unit 251, data compression unit 252 and encoding unit 253, the signal processing unit 13 of FIG. 15 basically has an identical construction to that of FIG. 7.

In the embodiment of FIG. 15, the full song data #1 which is broadcast first, and the full song data #2 broadcast after it so that part overlaps, are input to the mixer 53, and in the mixer 53, they are mixed with the DJ's voice, jingles, etc., and output. Herein, to simplify the description, it will be assumed that the DJ's voice, etc., is not superimposed on the full song data #1 and #2.

The full song data #1 and #2 are also supplied to the overlap detecting element 251. In the overlap detecting element 251, the interval wherein the full song data #1 and #2 overlap (referred to hereafter as overlap interval) is detected, and the full song data #1 and #2 in this overlap interval, i.e., the overlapping part of the full song data #1 and the overlapping part of the full song data #2, are supplied as generating data to the data compression unit 252. In the data compression unit 252, either the overlapping part of the full song data #1 or the overlapping part of the full song data #2 which are generating data, or both, are compressed, and supplied to the encoding unit 253. In the encoding unit 253, the generating data output by the data compression unit 252 outputs is encoded, and supplied to the MUX 58.

In the signal processing unit 13 of FIG. 15, except for the fact that the generating data output by the encoder 253 is disposed in the (data broadcast contents of the) data broadcast data instead of compressed encoded data, the actual broadcast data and data broadcast data are constructed and output as in the case described in FIG. 7.

The signal processing unit 27 of the user terminal 3 (FIG. 5) in the case where the aforesaid data broadcast data is transmitted, has an identical construction to, for example, that shown in FIG. 13.

When generating the full song data #1, if the overlapping part of the full song data #1 is included as generating data, in the computing unit 162, the full song data #1 is generated by replacing the overlapping part of the actual broadcast data by the overlapping part of the full song data #1. On the other hand, if the overlapping part of the full song data #2 is included as generating data, in the computing unit 162, the full song data #1 is generated by subtracting the overlapping part of the full song data #2 from the overlapping part of the actual broadcast data.

Likewise, when generating the full song data #2, if the overlapping part of the full song data #2 is included as generating data, in the computing unit 162, the full song data #2 is generated by replacing the overlapping part of the actual broadcast data by the overlapping part of the full song data #2. On the other hand, if the overlapping part of the full song data #1 is included as generating data, in the computing unit 162, the full song data #2 is generated by subtracting the overlapping part of the full song data #1 from the overlapping part of the actual broadcast data.

When the overlapping parts of both the full song data #1 and #2 are included as generating data, the full song data #1 or #2 may be generated by either the above replacement or subtraction.

When the full song data #1 and #2 are broadcast without overlapping, the overlapping parts of the full song data #1 and #2 are both 0. In this case, the full song data #1 and #2 may be obtained by receiving the actual broadcast data.

In the embodiment of FIG. 15, the overlap interval part detected by the overlap detecting unit 251 (apart from its length, this may also be the start point and end point of the overlap interval) may be included in the data broadcast data and transmitted.

Moreover, the overlap interval can be made adjustable by adjusting the time at which input of the full song data #2 is started.

Next, in the embodiment of FIG. 12 and FIG. 15, in the actual broadcast data, parts where the DJ's voice are superimposed on the full song data or overlapping parts are different from the full song data. However, other parts consist only of full song data, and if there are only a few parts where the DJ's voice is superimposed or overlapping parts in the actual broadcast data, there will be practically no difference from the full song data. In this case, it may occur that an increasing number of users are content to record the actual broadcast and the number of downloads will decrease. This situation is undesirable from the viewpoint of the EMD service operator.

For this reason, in the transmitting device 1, when for example the full song data shown in FIG. 16A is to be transmitted, this full song data may be split into a low frequency component and a high frequency component, or into an upper bit and a lower bit, as shown in FIG. 16B and FIG. 16C. The low frequency component or upper bit is then transmitted as the actual broadcast data, while the high frequency component or lower bit is transmitted as generating data contained in the data broadcast data.

In this case, in the actual broadcast, a song which has deteriorated sound quality compared to the full song data is broadcast, but the user can listen to a song with high sound quality by generating the full song data using the high frequency component or lower bit as generating data.

FIG. 17 shows an example of the construction of the signal processing unit 13 of the transmitting device 1 (FIG. 4), in the case where the full song data is split into a low frequency component and high frequency component or an upper bit and lower bit, the low frequency component or upper bit is transmitted as actual broadcast data, and the high frequency component or lower bit is transmitted as generating data contained in the data broadcast data. In the figure, parts corresponding to the case of FIG. 7 are assigned identical symbols, and their description is herebelow omitted for convenience. Specifically, except for the provision of a data splitting unit 351, data compression unit 352 and encoding unit 353, the signal processing unit 13 of FIG. 17 has a basically identical construction to that of FIG. 7.

The full song data of the song broadcast in the actual broadcast is supplied to the data splitting unit 351, and the data splitting unit 351 splits the full song data into a low frequency component and high frequency component, or an upper bit and lower bit.

Specifically, the data splitting unit 351 for example sub-band encodes the full song data, and splits it into plural frequency components. Of these plural frequency components, the highest bands for example are taken as the high frequency component, the remainder are taken as the low frequency component, and these components are then output. Alternatively, the data splitting unit 351 for example applies a discrete cosine transformation to the full song data, takes low order coefficients as the low frequency component and high order coefficients as the high frequency component, and then outputs these components. The data splitting unit 351 can also simply split the full song data into an upper bit and lower bit, and output these.

In the following description, for convenience, the low frequency component or upper bit obtained by the data splitting unit 351 shall be referred to as ordinary sound quality song data, and the high frequency component or lower bit shall be referred to as high sound quality data.

The ordinary sound quality song data output by the splitting unit 351 is supplied to the mixer 53, and then transmitted as actual broadcast data in the same way as in the case described above.

The high sound quality data output by the data splitting unit 351 is supplied to the data compression unit 352 as generating data. In the data compression unit 352, the high sound quality data which is generating data is compressed, and supplied to the encoding unit 353. In the encoding unit 353, the generating data output by the data compression unit 352 is encoded, and supplied to the MUX 58.

In the signal processing unit 13 of FIG. 17, except for the fact that generating data output by the encoding unit 353 is disposed in the (data broadcast contents of the) data broadcast data instead of compressed encoded data, data broadcast data is constructed and output in the same way as described for FIG. 7.

The signal processing unit 27 of the user terminal 3 (FIG. 5) in the case where the data broadcast data described above is transmitted, may for example have an identical construction to that shown in FIG. 13.

In FIG. 13, the actual broadcast data output by the data expansion unit 61 is ordinary sound quality song data, i.e., it is the low frequency component or upper bit of the full song data, so the sound quality is worse than in the case where the full song data is reproduced.

Therefore, a user who desires higher sound quality must acquire a decoding key to decode the generating data and generate the full song data in the same way as described for FIG. 13.

In this case, in the computing unit 162 of FIG. 13, the full song data is generated by performing sub-band decoding and a reverse discrete cosine transformation using the actual broadcast data and generating data, and combining the actual broadcast data which is the upper bit with the generating data which is the lower bit.

Hence, as described above, when full song data is provided using the actual broadcast data, it is sufficient to transmit compressed and encoded generating data, which basically has a lower data amount than the compressed, encoded data obtained by compressing and encoding the entire full song data, in the data broadcast. This allows other data to be contained in the data broadcast data, or allows the data broadcast data to be transferred with a smaller transfer capacity.

In the above case, the generating data was transmitted in the data broadcast data, but the generating data can also be provided together with a decoding key from the EMD server 5 without including it (or in addition to including it) in the data broadcast data.

In the above description, while a song #k was being transmitted in an actual broadcast, bookmark data was disposed in the bookmark part (FIG. 3) as information for acquiring the song #k and transmitted periodically, while jacket photo data and compressed encoded data for the song #k was disposed and transmitted in the concluding part (FIG. 3). In other words, in the actual broadcast, transmission of data broadcast data for the song #k started together with transmission of the song #k and ended when the transmission ended, however in the data broadcast data, transmission of bookmark data for the song #k can take place during the actual broadcast of the song #k as in the above case, while transmission of jacket photo data or compressed encoded data for the song #k can be performed at a different time from the time when the actual broadcast of the song #k is made (therefore, the time at which transmission begins is different).

For example, the jacket photo or other data for the song #k can be transmitted in the data broadcast data for the song #k−1 which is transmitted in the actual broadcast prior to the song #k, as shown in FIG. 18.

Image data such as jacket photos generally contain a large amount of data, and if they are transmitted in a data broadcast together with the beginning of the actual broadcast of the song #k, the jacket photo cannot be displayed by the user terminal 3 until some time (time required to transmit the jacket photo or other image data) has elapsed from beginning the actual broadcast of the song #k. The user therefore has to wait a certain time after the actual broadcast of the song #k has started until the jacket photo for the song #k can be seen.

On the other hand, if the jacket photo or other data for the song #k is included in the data broadcast data for the song #k−1 which is broadcast earlier in the actual broadcast than the song #k, all the data for the jacket photo for the song #k is received by the user terminal 3 when actual broadcast of the song #k begins, and therefore the user can see the jacket photo for the song #k immediately after actual broadcast of the song #k starts.

Also, for example, compressed encoded data for the song #k may be transmitted in the data broadcast data for the song #k+1 which is broadcast later than the song #k, as shown in FIG. 18.

As described in FIG. 10, storage (recording) of the compressed encoded data for the song #k in the storage 64 (FIG. 9) is started by a bookmark operation of the control unit 31 (FIG. 5). Therefore, as the compressed encoded data for the song #k is transmitted in the data broadcast while the actual broadcast of the song #k is taking place, it may occur that, if the user performs a bookmark operation after listening to the song #k in the actual broadcast for some time, transmission of the compressed encoded data for the song #k has already begun.

Conversely, if the compressed encoded data for the song #k is transmitted in the data broadcast data for the song #k+1 which is broadcast in the actual broadcast later than the song #k, and if the user performs a bookmark operation after listening to the song #k in the actual broadcast for some time after transmission of compressed encoded data for the song #k has started following the end of the actual transmission of the song #k, reception of the compressed encoded data for the song #k can be performed after waiting for the end of the actual broadcast of the song #k and the start of the data broadcast for the song #k.

Herein, transmission of compressed encoded data for the song #k in the data broadcast data for the song #k+1 which is broadcast in the actual broadcast later than the song #k is particularly effective when the signal processing unit 27 (FIG. 9) of the user terminal 3 does not include, for example, the memory 63A. Specifically, if the memory 63A is not provided in the signal processing unit 27, and compressed encoded data for the song #k is broadcast in the data broadcast during the actual broadcast of the song #k, it may occur that when a bookmark operation is performed, transmission of the compressed encoded data for the song #k may have finished in the middle (or at the end) so that the correct compressed encoded data can no longer be obtained. On the other hand, when the compressed encoded data for the song #k is contained in the data broadcast data for the song #k+1, the correct compressed encoded data for the song #k can be obtained after starting actual broadcast of the song #k+1 even if the memory 63A is not provided.

In the above case, compressed encoded data for the song #k−1 and image data such as a jacket photo for the song #k+1 are transmitted in the data broadcast data for the song #k.

There is no particular limitation on the position of data such as the jacket photo for the song #k in the data broadcast data for the song #k−1, but in the embodiment of FIG. 18, the arrangement is such that when the actual broadcast of the song #k−1 finishes, transmission of the jacket photo or other data for the song #k also finishes simultaneously.

Further, there is no particular limitation on the position of compressed encoded data for the song #k in the data broadcast data for the song #k+1, but in the embodiment of FIG. 18, the arrangement is such that when data transmission for the song #k+1 begins, transmission of the compressed encoded data for the song #k also begins simultaneously.

The jacket photo or other data for the song #k may be contained not only in the data broadcast data for the song #k−1, but also in data broadcast data which is broadcast earlier than this. Likewise, the compressed encoded data for the song #k may be contained not only in the data broadcast data for the song #k+1, but also in data broadcast data which is broadcast later than this.

Figure 19:
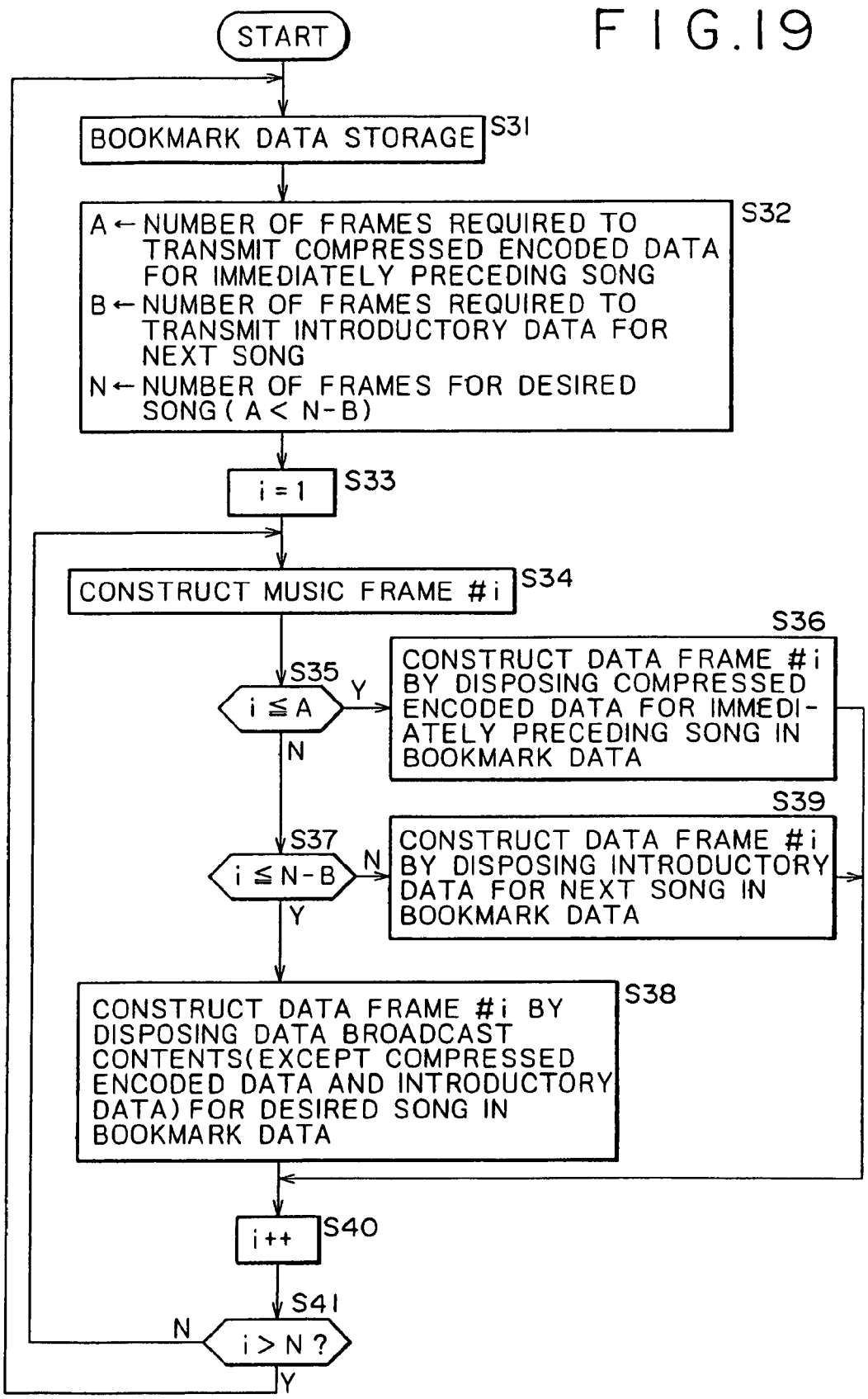
FIG. 19 is a flowchart for describing the processing of the synchronizing circuit 55 in FIG. 7.

Next, referring to the flowchart of FIG. 19, the processing of the synchronizing circuit 55 in the signal processing unit 13 (FIG. 7) of the transmitting device 1 (FIG. 4) will be described when transmission of the bookmark data (first additional data) for the song #k in the data broadcast data is performed during actual broadcast of the song #k, and transmission of jacket photo data or compressed encoded data (second additional data) for the song #k is performed as a different time to the actual broadcast of the song #k, as shown in FIG. 18. Herein, it will be assumed that the song #k is a desired song currently being processed.

Firstly in a step S31, in the synchronizing circuit 55, bookmark data for the desired song #k supplied thereto is stored in the memory 55A. The routine then proceeds to a step S32, a number of data frames required to transmit compressed encoded data for the song #k−1 broadcast earlier than the desired song #k is set in a parameter A, and a number of data frames required to transmit image data such as a jacket photo (this is intended to introduce the song and will therefore be referred to hereafter as introductory data for convenience) for the song #k+1, which is broadcast after the desired song #k, is set in a parameter B. Further, in the step S32, a number of music frames required to transmit the desired song #k is set in a parameter N. Herein, it will be assumed that the relation A<N−B holds for the parameters A, B, N.

Subsequently, in a step S33, an initial value of 1 is set in the parameter i for counting the number of music frames and data frames, the routine proceeds to a step S34 where a music frame #i is constructed, and the routine proceeds to a step S35. In the step S35, it is determined whether or not the parameter i is equal to or less than the parameter A.

When it is determined in the step S35 that the parameter i is equal to or less than the parameter A, i.e., when it is determined that the number of data frames transmitted for the song #k is equal to or less than the number of data frames required to transmit compressed encoded data for the song #k−1, the routine proceeds to a step S36, and compressed encoded data for the song #k−1 is disposed after the bookmark data stored in the memory 55A so as to construct a data frame #i. This data frame #i and the music frame #i formed in the step S34 are then output by the synchronizing circuit 55, and the routine proceeds to a step S40.

When on the other hand it is determined in the step S35 that the parameter i is not equal to or less than the parameter A, i.e., when transmission of compressed encoded data for the song #k−1 has completely finished, the routine proceeds to a step S37 and it is determined whether or not the parameter i is equal to or less than N−B.

In the step S37, when it is determined that the parameter i is equal to or less than N−B, i.e., when the number of remaining data frames transmitted for the song #k is greater than the number of data frames required to transmit introductory data for the song #k+1, the routine proceeds to a step S38, and the data broadcast contents for the desired song #k (excepting compressed encoded data and introductory data) are disposed after the bookmark data stored in the memory 55A to form the data frame #i. This data frame #i and the music frame #i formed in the step S34 are then output by the synchronizing circuit 55, and the routine proceeds to the step S40.

When on the other hand it is determined in the step S37 that the parameter i is not equal to or less than N−B, i.e., when the number of remaining data frames transmitted for the song #k is equal to or less than the number data frames required to transmit introductory data for the song #k+1, the routine proceeds to a step S39, and introductory data for the song #k+1 are disposed after the bookmark data stored in the memory 55A to form the data frame #i. This data frame #i and the music frame #i formed in the step S34 are then output by the synchronizing circuit 55, and the routine proceeds to the step S40.

In the step S40, the parameter i is incremented by 1, the routine proceeds to a step S41, and it is determined whether or not the parameter i is larger than the parameter N. When it is determined in the step S41 that the parameter i is not larger than the parameter N, i.e., when all the music frames and data frames for the desired song #k have not yet been transmitted, the routine returns to the step S34 and the same processing is repeated thereafter.

On the other hand, when it is determined in the step S41 that the parameter i is larger than the parameter N, i.e., when all the music frames and data frames for the desired song #k have been transmitted, the routine waits for bookmark data for the next song #k+1 to be supplied, returns to the step S31, and processing from the step S31 is repeated with the next song #k+1 as the new desired song.

Jacket photo data, etc., for the song #k can also be transmitted spanning data broadcast data for the song #k−1 and the song #k. Likewise, compressed encoded data for the song #k can also be transmitted spanning data broadcast data for the song #k and the song #k+1. In other words, the time at which transmission of jacket photo data or compressed encoded data for the song #k begins can be arbitrarily set.

In the above case, encoded data for the song #k was disposed in data broadcast data for the song #k+1, but generating data for the song #k may also be disposed in data broadcast data for the song #k+1.

This invention has been described in the context of its application to radio broadcasting, however it may also be applied to television broadcasting or the like. If this invention is applied to television broadcasting, it may be used to provide image data such as films broadcast during television broadcasts (if services providing audio data are referred to as EMD services as described above, services providing image data may be referred to as EVD (Electric Video Distribution), or for example, if a game software scenario is broadcast during a television broadcast, it may be used to provide the game software (computer program). This invention may also be applied to, for example, services providing book data (e.g., "electronic book data").

The embodiments of this invention used terrestrial waves as the transfer medium 2 (FIG. 1), but satellite circuits, the Internet and CATV (Cable Television) networks can also be employed as the transfer medium 2.

In the embodiments of this invention, compressed encoded data where full song data was encoded and compressed generating data were provided, but full song data and generating data may also be provided without encoding.

In the embodiments of this invention, the decoding key was provided at a charge, but it may also be provided free of charge.

In the embodiments of this invention, a predetermined input was given to the signal processing unit 27 by operating the control unit 31 (FIG. 5), but a predetermined input can be given to the signal processing unit 27 also by, for example, voice. In this case, however, a voice recognition device which performs voice recognition is required.

Also, in the embodiments of this invention, bookmark data was transmitted periodically by disposing it in the bookmark part of data frames, but it is not absolutely necessary to transmit it periodically.

As described above, according to the transmitting method and transmitting device of this invention, additional information is constructed by disposing acquiring information necessary to acquire related data related to a broadcast signal, the broadcast signal is transmitted, and the additional information, wherein the acquiring information concerning the related data related to the broadcast signal is disposed, is transmitted on plural occasions during transmission of the broadcast signal. Therefore on the receiving side, the acquiring information can be received with less risk of error, and the related data can be obtained easily based on this acquiring information.

Further, according to the receiving method and receiving device of this invention, the broadcast signal and the additional information wherein the acquiring information concerning the related data related to the broadcast signal is disposed, are received, and when there is a predetermined input, the acquiring information disposed in the additional information is stored. Therefore, the user can easily obtain the related data based on the acquiring information.

Further, according to the transfer method and transfer device of this invention, additional information is constructed by disposing acquiring information necessary to acquire related data related to a broadcast signal, the broadcast signal is transmitted, and the additional information, wherein the acquiring information concerning the related data related to the broadcast signal is disposed, is transmitted on plural occasions during transmission of the broadcast signal. When the broadcast signal and additional information are received and there is a predetermined input, the acquiring information disposed in the additional information is stored. Therefore on the receiving side, the acquiring information can be received with less risk of error, and the related data can be obtained easily based on this acquiring information.

What is claimed:

1. A method for communicating with an external device comprising:
   receiving a broadcasting signal and additional information including identification information identifying content of the broadcasting signal from a broadcasting station through a first transmission method;
   storing the identification information when a predetermined operation is made by a user; and
   transmitting, to the external device different from the broadcasting station and through a second transmission method different from the first transmission method, the identification information being used for downloading digital multimedia data related to the content of the broadcasting signal,
   wherein the broadcasting signal is received during a first time period,
   wherein the additional information is received during a second time period, and
   wherein the first time period and the second time period at least partially overlap.

2. The method according to claim 1, wherein the broadcasting station is a radio station.

3. The method according to claim 1, wherein the additional information further includes at least one of an artist name and title of the content of the broadcasting signal, at least a part of the additional information is displayed when the broadcasting signal and the additional information is received.

4. The method according to the claim 1, wherein the external device is a server providing digital multimedia data on the Internet.

5. The method according to claim 1, wherein the digital multimedia data is compressed in a predetermined format.

6. The method according to claim 1, wherein the broadcasting signal and additional information do not include digital multimedia data.

7. The method according to claim 1, wherein the broadcasting station is a radio station and the first transmission method includes communicating via terrestrial waves.

8. The method according to claim 1, wherein the broadcasting station is a satellite broadcasting station and the first transmission method includes communicating via satellite signals.

9. The method according to claim 1, wherein the broadcasting station is an internet broadcasting station and the first transmission method includes communicating via the internet.

10. The method according to claim 1, wherein the additional information is used to download a key for decoding the downloaded digital multimedia data.

11. The method according to claim 1, wherein the additional information includes access information corresponding to the content of the broadcasting signal.

12. The method according to claim 11, wherein the access information identifies an address corresponding to a location from which the digital multimedia data can be downloaded.

13. The method according to claim 11, wherein the additional information identifies an address corresponding to a webpage that provides information corresponding to the content of the broadcasting signal.

14. The method according to claim 1, wherein the broadcasting signal includes a plurality of segments of content.

15. The method according to claim 14, wherein the additional information includes a plurality of segments of additional information, each associated with one of the plurality of segments of content.

16. The method according to claim 15, wherein only one of the plurality of segments of additional information is received for each of the plurality of segments of content included in the broadcasting signal.

17. The method according to claim 1, further comprising: recording the received broadcasting signal upon receiving the predetermined operation made by the user.

18. The method according to claim 1, wherein the additional information includes at least one of an album cover corresponding to the content of the broadcasting signal, text corresponding to a title of the content of the broadcasting signal, an artist's name corresponding to the content of the broadcasting signal and a name of a production company corresponding to the content of the broadcasting signal.

19. The method according to claim 1, further comprising: controlling a display to display information corresponding to the additional information.

20. The method according to claim 19, wherein the additional information includes at least one of an album cover corresponding to the content of the broadcasting signal, text corresponding to a title of the content of the broadcasting signal, an artist's name corresponding to the content of the broadcasting signal and a name of a production company corresponding to the content of the broadcasting signal, and the method further comprises controlling the display to display at least one of the album cover corresponding to the content of the broadcasting signal, the text corresponding to the title of the content of the broadcasting signal, the artist's name corresponding to the content of the broadcasting signal and the name of a production company corresponding to the content of the broadcasting signal.

21. The method according to claim 1, wherein the broadcasting signal and the additional information are received simultaneously.

22. The method according to claim 1, wherein the broadcasting signal is received in first frame units and the additional information is received in second frame units, and wherein the first frame units are synchronized with the second frame units.

23. The method according to claim 1, wherein the broadcasting signal is received over a first channel and the additional information is received over a second channel.

24. The method according to claim 1, wherein the additional information is received on a first channel, and wherein the additional information is temporarily stored in a temporary storage device based upon a determination that the transmission of the additional information has been temporarily interrupted.

25. The method according to claim 1, wherein the predetermined operation is made by the user during the first time period.

26. A device for communicating with an external device, comprising:

means for receiving a broadcasting signal and additional information including identification information identifying content of the broadcasting signal from a broadcasting station through a first transmission method;

means for storing the identification information when a predetermined operation is made by a user; and means for transmitting, to the external device different from the broadcasting station and through a second transmission method different from the first transmission method, the identification information being used for downloading digital multimedia data related to the content of the broadcasting signal, wherein the broadcasting signal is received during a first time period, wherein the additional information is received during a second time period, and wherein the first time period and the second time period at least partially overlap.

27. The device according to claim 26, wherein the broadcasting station is a radio station.

28. The device according to claim 26, wherein the additional information further includes at least one of an artist name and title of the content of the broadcasting signal, at least a part of the additional information is displayed when the broadcasting signal and the additional information is received.

29. The device according to claim 26, wherein the external device is a server providing digital multimedia data on the Internet.

30. The device according to claim 26, wherein the digital multimedia data is compressed in a predetermined format.

31. The device according to claim 26, wherein the broadcasting signal and additional information do not include digital multimedia data.

32. A non-transitory computer-readable storage medium encoded with instructions which, when executed on a processor, perform a method, the method comprising:

receiving a broadcasting signal and additional information including identification information-identifying content of the broadcasting signal from a broadcasting station through a first transmission method;

storing the identification information when a predetermined operation is made by a user; and transmitting, to an external device different from the broadcasting station and through a second transmission method different from the first transmission method, the identification information being used for downloading digital multimedia data related to the content of the broadcasting signal, wherein the broadcasting signal is received during a first time period, wherein the additional information is received during a second time period, and wherein the first time period and the second time period at least partially overlap.

33. The non-transitory computer-readable storage medium of claim 32, wherein the broadcasting station is a radio station.

34. The non-transitory computer-readable storage medium of claim 32, wherein the broadcasting station is a radio station and the first transmission method includes communicating via terrestrial waves.

35. The non-transitory computer-readable storage medium of claim 32, wherein the broadcasting station is a satellite broadcasting station and the first transmission method includes communicating via satellite signals.

36. The non-transitory computer-readable storage medium of claim 32, wherein the broadcasting station is an internet broadcasting station and the first transmission method includes communicating via the internet.

37. The non-transitory computer-readable storage medium of claim 32, wherein the additional information further includes at least one of an artist name and a title of the content of the broadcasting signal.

38. The non-transitory computer-readable storage medium of claim 32, wherein the method further comprises controlling a display to display at least a part of the additional information when the broadcasting signal and the additional information is received.

39. The non-transitory computer-readable storage medium of claim 32, wherein the external device is a server providing digital multimedia data via the Internet.

40. The non-transitory computer-readable storage medium of claim 32, wherein the digital multimedia is compressed in a predetermined format.

41. The non-transitory computer-readable storage medium of claim 32, wherein the broadcasting signal and additional information do not include digital multimedia data.

42. The non-transitory computer-readable storage medium of claim 32, wherein the broadcasting signal and the additional information are received simultaneously.

43. The non-transitory computer-readable storage medium of claim 32, wherein the broadcasting signal is received in first frame units and the additional information is received in second frame units.

44. The non-transitory computer-readable storage medium of claim 43, wherein the first frame units are synchronized with the second frame units.

45. The non-transitory computer-readable storage medium of claim 32, wherein the broadcasting signal is received over a first channel, and the additional information is received over a second channel.

46. The non-transitory computer-readable storage medium of claim 32, wherein the additional information is received on a first channel, and the method further comprises temporarily storing the additional information based on a determination that the transmission of the additional information has been temporarily interrupted.

47. The non-transitory computer-readable storage medium of claim 32, wherein the predetermined operation is made by the user during the first time period.

48. The non-transitory computer-readable storage medium of claim 32, wherein the additional information is used to download a key for decoding the downloaded digital multimedia data.

49. The non-transitory computer-readable storage medium of claim 32, wherein the additional information includes access information corresponding to the content of the broadcasting signal.

50. The non-transitory computer-readable storage medium of claim 49, wherein the access information identifies an address corresponding to a location from which the digital multimedia data can be downloaded.

51. The non-transitory computer-readable storage medium of claim 49, wherein the additional information identifies an address corresponding to a webpage that provides information corresponding to the content of the broadcasting signal.

52. The non-transitory computer-readable storage medium of claim 32, wherein the broadcasting signal includes a plurality of segments of content.

53. The non-transitory computer-readable storage medium of claim 52, wherein the additional information includes a plurality of segments of additional information, each associated with one of the plurality of segments of content.

54. The non-transitory computer-readable storage medium of claim 53, wherein only one of the plurality of segments of additional information is received for each of the plurality of segments of content included in the broadcasting signal.

55. The non-transitory computer-readable storage medium of claim 32, wherein the method further comprises recording the received broadcasting signal upon receiving the predetermined operation made by the user.

56. non-transitory computer-readable storage medium of claim 32, wherein the additional information includes at least one of an album cover corresponding to the content of the broadcasting signal, text corresponding to a title of the content of the broadcasting signal, an artist's name corresponding to the content of the broadcasting signal and a name of a production company corresponding to the content of the broadcasting signal.

57. The non-transitory computer-readable storage medium of claim 32, wherein the method further comprises controlling a display to display information corresponding to the additional information.

58. The non-transitory computer-readable storage medium of claim 57, wherein
the additional information includes at least one of an album cover corresponding to the content of the broadcasting signal, text corresponding to a title of the content of the broadcasting signal, an artist's name corresponding to the content of the broadcasting signal and a name of a production company corresponding to the content of the broadcasting signal, and
the method further comprises controlling the display to display at least one of the album cover corresponding to the content of the broadcasting signal, the text corresponding to the title of the content of the broadcasting signal, the artist's name corresponding to the content of the broadcasting signal and the name of a production company corresponding to the content of the broadcasting signal.

59. A device for communicating with an external device, comprising: circuitry configured to:
receive a broadcast signal and additional information including identification information identifying content of the broadcast signal from a broadcast station through a first transmission method;
store the identification information when a predetermined operation is made by a user; and
transmit, to the external device different from the broadcast station and through a second transmission method different from the first transmission method, the identification information being used for downloading digital multimedia related to the content of the broadcast signal, wherein
the broadcast signal is received during a first time period,
the additional information is received during a second time period, and
the first time period and the second time period at least partially overlap.

60. The device of claim 59, wherein the broadcast station is a radio station.

61. The device of claim 59, wherein the broadcast station is a radio station and the first transmission method includes communicating via terrestrial waves.

62. The device of claim 59, wherein the broadcast station is a satellite broadcast station and the first transmission method includes communicating via satellite signals.

63. The device of claim 59, wherein the broadcast station is an internet broadcast station and the first transmission method includes communicating via the internet.

64. The device of claim 59, wherein the additional information further includes at least one of an artist name and a title of the content of the broadcast signal.

65. The device of claim 59, wherein the circuitry is configured to control a display to display at least a part of the additional information when the broadcast signal and the additional information is received.

66. The device of claim 59, wherein the external device is a server providing digital multimedia data via the Internet.

67. The device of claim 59, wherein the digital multimedia is compressed in a predetermined format.

68. The device of claim 59, wherein the broadcast signal and additional information do not include digital multimedia data.

69. The device of claim 59, wherein the broadcast signal and the additional information are received simultaneously.

70. The device of claim 59, wherein the broadcast signal is received in first frame units and the additional information is received in second frame units.

71. The device of claim 70, wherein the first frame units are synchronized with the second frame units.

72. The device of claim 59, wherein the broadcast signal is received over a first channel, and the additional information is received over a second channel.

73. The device of claim 59, wherein the additional information is received on a first channel, and the circuitry is configured to temporarily store the additional information based on a determination that the transmission of the additional information has been temporarily interrupted.

74. The device of claim 59, wherein the predetermined operation is made by the user during the first time period.

75. The device of claim 59, wherein the additional information is used to download a key for decoding the downloaded digital multimedia data.

76. The device of claim 59, wherein the additional information includes access information corresponding to the content of the broadcast signal.

77. The device of claim 76, wherein the access information identifies an address corresponding to a location from which the digital multimedia data can be downloaded.

78. The device of claim 76, wherein the additional information identifies an address corresponding to a webpage that provides information corresponding to the content of the broadcast signal.

79. The device of claim 59, wherein the broadcast signal includes a plurality of segments of content.

80. The device of claim 79, wherein the additional information includes a plurality of segments of additional information, each associated with one of the plurality of segments of content.

81. The device of claim 80, wherein only one of the plurality of segments of additional information is received for each of the plurality of segments of content included in the broadcast signal.

82. The device of claim 59, wherein the circuitry is configured to record the received broadcast signal upon receiving the predetermined operation made by the user.

83. The device of claim 59, wherein the additional information includes at least one of an album cover corresponding to the content of the broadcast signal, text corresponding to a title of the content of the broadcast signal, an artist's name corresponding to the content of the broadcast signal and a name of a production company corresponding to the content of the broadcast signal.

84. The device of claim 59, further comprising:

a display, wherein the circuitry is configured to control the display to display information corresponding to the additional information.

85. The device of claim 84, wherein the additional information includes at least one of an album cover corresponding to the content of the broadcast signal, text corresponding to a title of the content of the broadcast signal, an artist's name corresponding to the content of the broadcast signal and a name of a production company corresponding to the content of the broadcast signal, and the circuitry is configured to control the display to display at least one of the album cover corresponding to the content of the broadcast signal, the text corresponding to the title of the content of the broadcast signal, the artist's name corresponding to the content of the broadcast signal and the name of a production company corresponding to the content of the broadcast signal.

* * * * *